US012328574B2

(12) United States Patent
Carmel-Veilleux et al.

(10) Patent No.: US 12,328,574 B2
(45) Date of Patent: Jun. 10, 2025

(54) SECURING RETURN COMMUNICATION THROUGH APPLICATION UNIFORM RESOURCE LOCATORS

(71) Applicant: Google LLC, Mountain View, CA (US)

(72) Inventors: Tennessee Carmel-Veilleux, Kitchener (CA); Douglas Andrew Steedman, San Francisco, CA (US)

(73) Assignee: Google LLC, Mountain View, CA (US)

( * ) Notice: Subject to any disclaimer, the term of this patent is extended or adjusted under 35 U.S.C. 154(b) by 251 days.

(21) Appl. No.: 18/306,870

(22) Filed: Apr. 25, 2023

(65) Prior Publication Data

US 2023/0354018 A1  Nov. 2, 2023

Related U.S. Application Data

(60) Provisional application No. 63/364,017, filed on May 2, 2022.

(51) Int. Cl.
*H04W 12/041* (2021.01)
*H04W 12/037* (2021.01)
*H04W 12/0433* (2021.01)

(52) U.S. Cl.
CPC ....... *H04W 12/041* (2021.01); *H04W 12/037* (2021.01); *H04W 12/0433* (2021.01)

(58) Field of Classification Search
CPC ............. H04W 12/041; H04W 12/037; H04W 12/0433
USPC ....................................................... 713/171
See application file for complete search history.

(56) References Cited

U.S. PATENT DOCUMENTS

| 9,410,712 | B2 * | 8/2016 | Smith | G05B 19/042 |
| 10,432,590 | B2 * | 10/2019 | Skuratovich | H04L 63/061 |
| 10,503,933 | B2 * | 12/2019 | Auh | H04L 9/0643 |
| 11,558,192 | B2 * | 1/2023 | Auh | H04L 9/0894 |
| 2019/0052608 | A1 * | 2/2019 | Skuratovich | H04L 63/061 |
| 2020/0356618 | A1 * | 11/2020 | Shribman | G06F 16/9558 |
| 2022/0129514 | A1 * | 4/2022 | Shribman | G06F 9/547 |
| 2022/0247835 | A1 * | 8/2022 | Shribman | H04L 43/0864 |
| 2022/0360565 | A1 * | 11/2022 | Shribman | H04L 67/02 |

(Continued)

OTHER PUBLICATIONS

"International Search Report and Written Opinion", Application No. PCT/US2023/066211, Aug. 2, 2023, 17 pages.

(Continued)

*Primary Examiner* — Samson B Lemma
(74) *Attorney, Agent, or Firm* — Colby Nipper PLLC

(57) ABSTRACT

Techniques and devices for securing return communication through application uniform resource locators are described for commissioning a joiner device to a home area network by an initiator device in which the initiator device obtains a Responder Access Uniform Resource Locator (URL) and using the obtained Responder Access URL, generates an Augmented Responder Access URL. The initiator device accesses the Augmented Responder Access URL at a responder, which causes the responder to generate a Responder Payload. The initiator device accesses an Augmented Initiator Response URL including the generated Responder Payload and recovers the Responder Payload, the recovery of the Responder Payload causing the initiator device to commission the joiner device to the home area network.

20 Claims, 12 Drawing Sheets

(56) References Cited

U.S. PATENT DOCUMENTS

2022/0368676 A1* 11/2022 Shribman ............ G06F 16/9566
2023/0367833 A1* 11/2023 Kol ..................... H04L 63/0227

OTHER PUBLICATIONS

"Matter Specification Version 1.0", https://csa-iot.org/wp-content/uploads/2022/11/22-27349-001_Matter-1.0-Core-Specification.pdf, Sep. 28, 2022, 400 pages.

Sarikaya, et al., "Secure IoT Bootstrapping: A Survey", draft-sarikaya-t2trg-sbootstrapping-07, Jul. 26, 2019, 22 pages.

Singh, et al., "Clearer than Mud: Extending Manufacturer Usage Description (MUD) for Securing IoT Systems", Jun. 18, 2019, pp. 43-57.

Unwala, et al., "IoT Security: ZWave and Thread", Apr. 4, 2018, pp. 176-182.

"International Preliminary Report on Patentability", Application No. PCT/US2023/066211, Oct. 29, 2024, 14 pages.

\* cited by examiner

SECURING RETURN COMMUNICATION THROUGH APPLICATION UNIFORM RESOURCE LOCATORS

CROSS-REFERENCE TO RELATED APPLICATIONS

This application claims priority to U.S. Provisional Application Ser. No. 63/364,017, filed May 2, 2022, the disclosure of which is incorporated by reference herein in its entirety.

BACKGROUND

Using wireless networking to connect devices to each other, and to cloud-based services, is increasingly popular for sensing environmental conditions, controlling equipment, and providing information and alerts to users. Many devices on wireless networks are designed to operate for extended periods of time on battery-power which limits the available computing, user interface, and radio resources in the devices.

To ensure the security of these networks, the identity of devices joining and operating on a wireless and/or wired network is authenticated, and communication within the network is encrypted, based on credentials that are commissioned into the devices. With the increasing ubiquity and scale of these networks, commissioning techniques limit the quality of user experience for commissioning, the accuracy of joining a device to the correct network, securely injecting credentials into the devices, and provisioning device-specific and application-specific information into a device during commissioning. As cross-vendor networking solutions evolve, there are opportunities to improve secure commissioning communications across multi-vendor networks.

SUMMARY

This summary is provided to introduce simplified concepts of securing return communication through application uniform resource locators, generally related to commissioning devices to home area networks. The simplified concepts are further described below in the Detailed Description. This summary is not intended to identify essential features of the claimed subject matter, nor is it intended for use in determining the scope of the claimed subject matter.

In aspects, methods, devices, systems, and means for securing return communication through application uniform resource locators are described for commissioning a joiner device to a home area network by an initiator device in which the initiator device obtains a Responder Access Uniform Resource Locator (URL) and using the obtained Responder Access URL, generates an Augmented Responder Access URL. The initiator device accesses the Augmented Responder Access URL at the responder that causes the responder to generate a Responder Payload. The initiator device accesses an Augmented Initiator Response URL including the generated Responder Payload and recovers the Responder Payload, the recovery of the Responder Payload causing the initiator device to commission the joiner device to the home area network.

In aspects, methods, devices, systems, and means for securing return communication through application uniform resource locators are described for commissioning a joiner device to a home area network by a responder, in which the responder publishes a Responder Access Uniform Resource Locator (URL) and receives, from an initiator device, an Augmented Responder Access URL. The responder extracts an Initiator-Payload-ciphertext-and-tag tuple and decodes the Initiator-Payload-ciphertext-and-tag tuple. The responder derives a shared secret using a private key associated with a public key of the responder and an ephemeral public key of the initiator device, and decrypts and authenticates an Initiator Payload using an authenticated encryption with associated data (AEAD) algorithm. If the Initiator Payload is authenticated, the responder recovers the Initiator Payload and generates a Responder Payload to send to the initiator device.

The details of one or more implementations are set forth in the accompanying drawings and the following description. Other features and advantages will be apparent from the description and drawings and from the claims. This summary is provided to introduce subject matter that is further described in the Detailed Description and Drawings. Accordingly, this summary should not be considered to describe essential features nor used to limit the scope of the claimed subject matter.

BRIEF DESCRIPTION OF THE DRAWINGS

Aspects of securing return communication through application uniform resource locators are described with reference to the following drawings. The same numbers are used throughout the drawings to reference like features and components.

DETAILED DESCRIPTION

Figure 1:
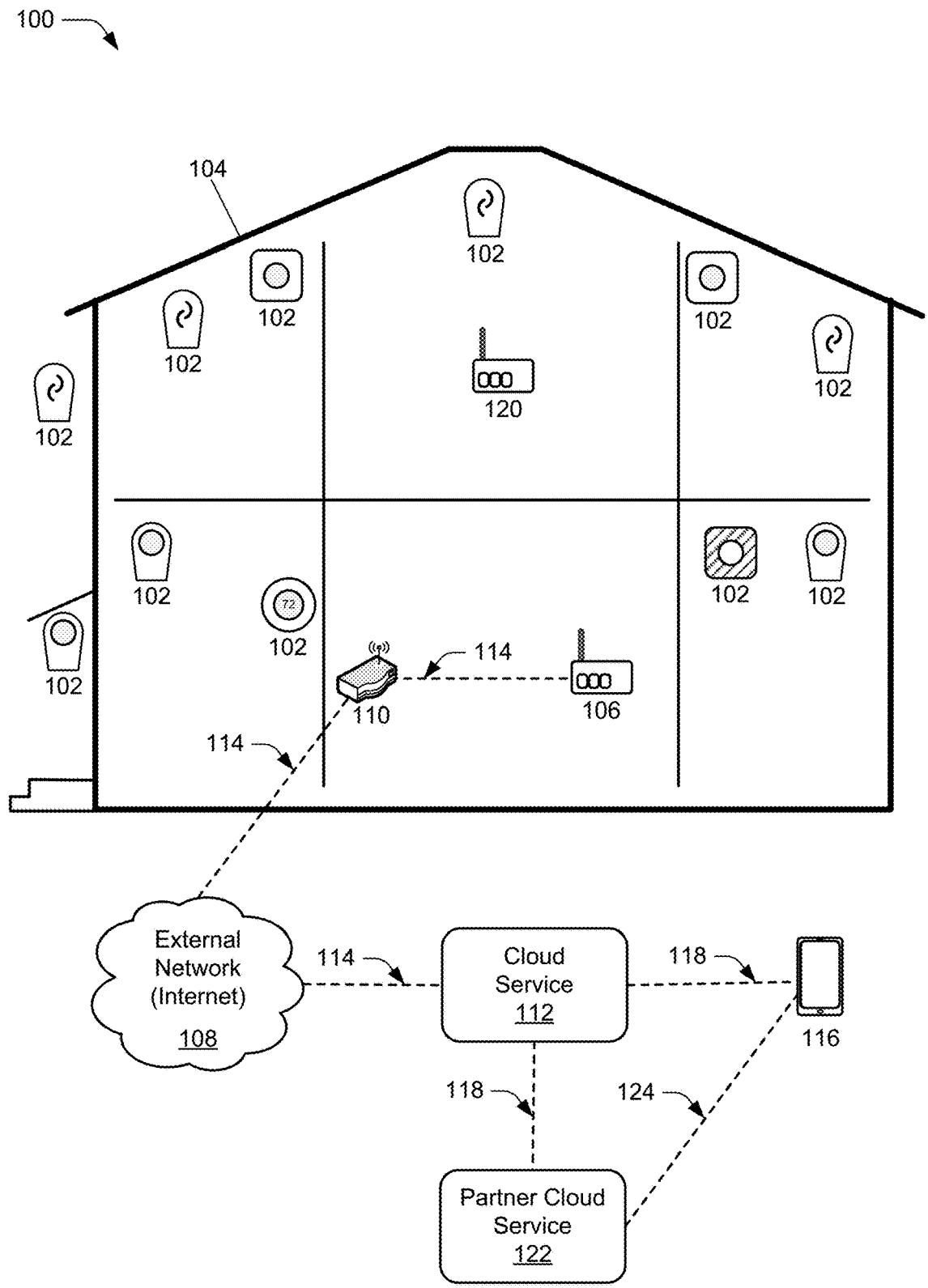
FIG. 1 illustrates an example network environment in which various aspects of securing return communication through application uniform resource locators can be implemented.

This document describes techniques and devices to provide secure communication for commissioning devices into a home area network (smart home network), such as a Matter network, a Thread network, a Weave network, or the like. For example, the setup of devices using the Matter protocol requires an onboarding payload that contains a passcode. Any entity capable of communication with a device over its setup interface (e.g. Wi-Fi, Thread, BLE) can use this passcode to become an administrator (commissioner) of that joining device.

Most setup flows in Matter are standard flows in the Matter protocol and use an initial passcode scanned from a QR code of a device that is being joined to the network. Some Matter setup flows, however, are custom commissioning flows. In these custom commissioning flows, the device to be setup is not ready to allow the Matter setup (commissioning) protocol to proceed. Rather, there is a requirement that the commissioning application has to obtain a custom-flow Uniform Resource Locator (URL) from a trusted ledger (e.g., a blockchain-based database of trusted data from Matter vendors and/or participants) and send the users to that URL, which will usually be a web page with additional instructions for the commissioning process. Upon finishing the manual, custom steps found at the custom-flow URL, through the aid of instructions or additional installed applications, the device will enter a state where the commissioner can proceed to setup the device.

The key problem in this scheme is that there is no way to go from an initial URL back to an application with a commissioning passcode that is needed to continue the commissioning process, without manual intervention by a user possibly across several applications. If a deep-link URL is accessed from the web content to which the user was directed by a commissioner application that accesses the custom-flow URL, there is no way to be sure when that callback URL is accessed and/or that it had anything to do with the initial user action. Furthermore, the commissioning passcode would need to be passed as plaintext, if included at all, because there is a not a single global key in use for the purposes of enciphering this information, and there is no specified mechanism of key exchange. In other words, a custom commissioning client attempting to go back to an initial commissioner would have to provide a passcode without secrecy, to a possibly untrusted application, in case a link has multiple possible handlers.

This problem is usually resolved by using end-to-end mechanisms to establish authenticated channel secrecy or by relying on business-to-business or peer-to-peer out-of-band communication. In some networking standards (e.g., Matter), since a commissioner application from any one of multiple vendors may be used and since there may or may not be cloud components in the networking standard, there is no interoperable method to establish such a secure channel to convey the information to ensure the initial commissioner can be reasonably certain it is receiving trustworthy information from the correct source and that no sensitive credentials are leaked.

Protocols such as Weave and Matter employ a QR code or other challenge payload to establish a root of trust by physical possession of the passcode and usage of a Password Authenticated Session Establishment (PASE) protocol based on Password-Authenticated Key Exchange (PAKE), for initial commissioning. In these protocols, the two peers have direct connectivity and there is no intermediary. The PAKE protocols strongly attempt to establish that there are no man-in-the-middle (MITM) or relays through protocol properties.

In general, key agreement between parties, based on the sharing of partially non-private information, uses schemes such as Diffie-Hellman and Elliptical Curve Diffie-Hellman key agreement. Aspects of securing return communication through application uniform resource locators relate to trust anchors (a fixed Responder Access URL obtained through trusted means), and the usage of URLs for the conveyance of every element of the protocol. Instead of directly messaging between two peers, the actions encompassing the steps of the protocol described herein are triggered by the access of specially-crafted URLs which need not be secret while still allowing the round trip to convey confidential information with authenticity and integrity.

In other aspects, securing return communication through application uniform resource locators describes communication across applications whether over the Internet or not, and possibly between processes of a device, without reliance on Hypertext Transfer Protocol (HTTP) and/or Hypertext Transfer Protocol Secure (HTTPS), without the same entity having developed the initiator and/or responder of the device, and without having to directly communicate out-of-band information other than the initiator (commissioner) having had access to a Responder Access URL. The techniques of securing return communication through application uniform resource locators enable an initiator to make use of a single URL to reach a responder with a private authenticated query that also embeds a return URL. These techniques enable the initiator to reach the responder whether the initiator and responder communicate across the Internet, within a home area network, or locally within a single device (e.g. a smartphone, using these techniques to communicate across applications on the smartphone). The techniques of securing return communication through application uniform resource locators abstract by a location (scheme, authority, path) to convey the transport hops that are needed to be crossed between the initiator and the responder, whether those hops are local or remote. The techniques enable the initiator to recover data from the responder, in an end-to-end authenticated and privacy-preserving manner.

Example Environment

FIG. 1 illustrates an example network environment 100 in which aspects of securing return communication through application uniform resource locators can be implemented. The network environment 100 includes a home area network (HAN) such as a HAN 200, described below with respect to FIG. 2. The HAN includes wireless network devices 102 that are disposed about a structure 104, such as a house, and are connected by one or more wireless and/or wired network technologies, as described below. The HAN includes a border router 106 that connects the HAN to an external network 108, such as the Internet, through a home router or access point 110 (Wireless Local Area Network (WLAN) access point 110).

To provide user access to functions implemented using the wireless network devices 102 in the HAN, a cloud service 112 connects to the HAN via border router 106, via a secure tunnel 114 through the external network 108 and the access point 110. The cloud service 112 facilitates communication between the HAN and internet clients 116, such as apps on mobile devices, using a web-based application programming interface (API) 118.

The HAN may include one or more wireless network devices 102 that function as a hub 120. The hub 120 may be a general-purpose home automation hub, or an application-specific hub, such as a security hub, an energy management hub, an HVAC hub, and so forth. The functionality of a hub 120 may also be integrated into any wireless network device 102, such as a smart thermostat device or the border router 106. In addition to hosting controllers on the cloud service 112, controllers can be hosted on any hub 120 in the structure 104, such as the border router 106. A controller hosted on the cloud service 112 can be moved dynamically to the hub 120 in the structure 104, such as moving an HVAC zone controller to a newly installed smart thermostat.

Hosting functionality on the hub 120 in the structure 104 can improve reliability when the user's internet connection is unreliable, can reduce latency of operations that would normally have to connect to the cloud service 112, and can satisfy system and regulatory constraints around local access between wireless network devices 102.

The wireless network devices 102 in the HAN may be from a single manufacturer that provides the cloud service 112 as well, or the HAN may include wireless network devices 102 from partners. These partners may also provide partner cloud services 122 that provide services related to their wireless network devices 102 through a partner Web API 124. The partner cloud service 122 may optionally or additionally provide services to internet clients 116 via the web-based API 118, the cloud service 112, and the secure tunnel 114.

The network environment 100 can be implemented on a variety of hosts, such as battery-powered microcontroller-based devices, line-powered devices, and servers that host cloud services. Protocols operating in the wireless network devices 102 and the cloud service 112 provide a number of services that support operations of home automation experiences in the network environment 100. These services include, but are not limited to, real-time distributed data management and subscriptions, command-and-response control, real-time event notification, historical data logging and preservation, cryptographically controlled security groups, time synchronization, network and service pairing, and software updates.

Figure 2:
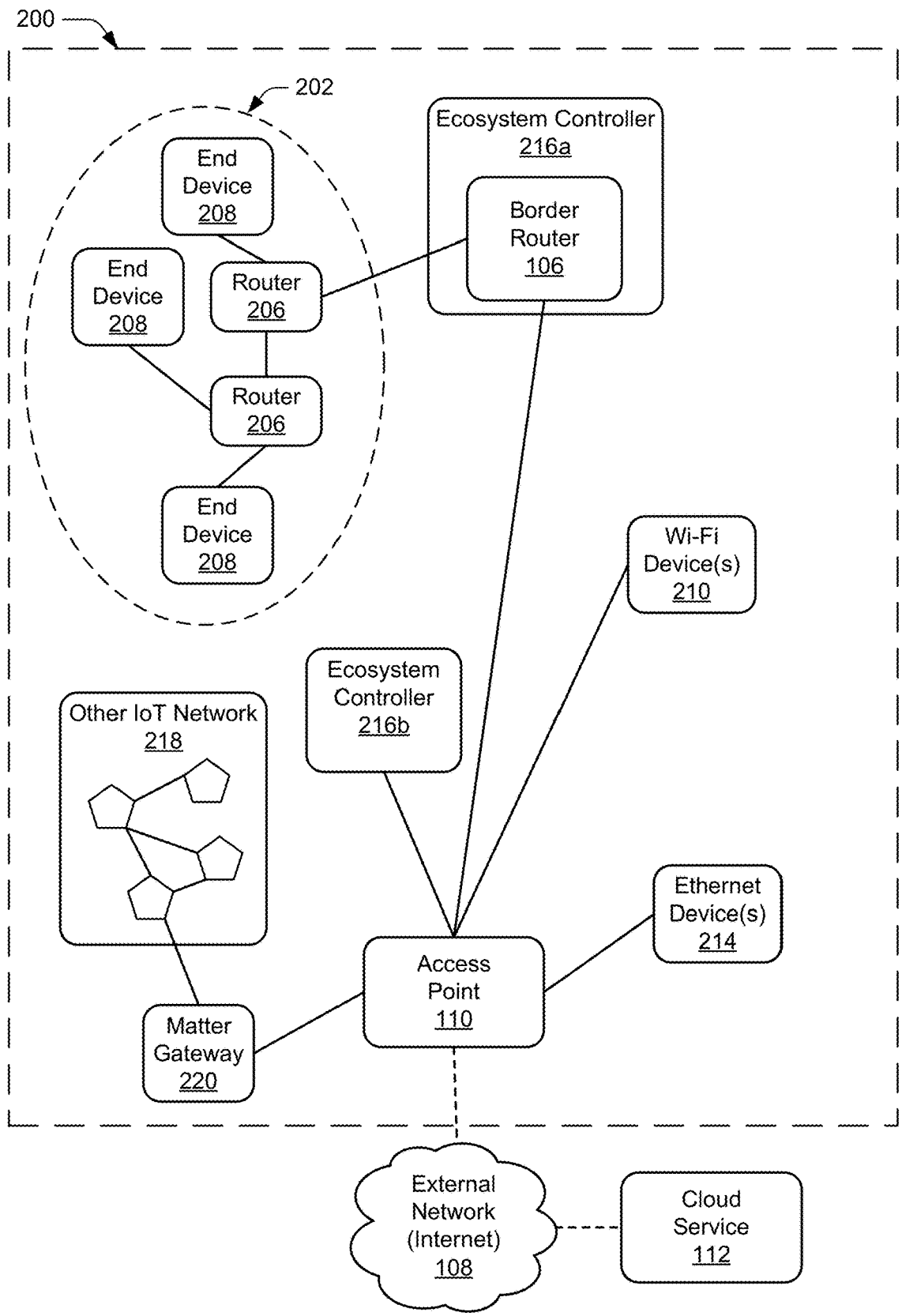
FIG. 2 illustrates an example home area network system in which various aspects of securing return communication through application uniform resource locators can be implemented.

FIG. 2 illustrates an example home area network system (e.g., Matter network, Weave network, fabric network) in which various aspects of securing return communication through application uniform resource locators can be implemented. The home area network (HAN) 200 (Matter network 200) includes a wireless mesh network 202 (e.g., a Thread network) and Wi-Fi device(s) 210. The HAN 200 may also include wired network devices (e.g., Ethernet device(s) 214). The wireless mesh network 202 includes routers 206 and end devices 208. The routers 206 and the end devices 208, each include a mesh network interface for communication over the mesh network 202. The routers 206 receive and transmit packet data over the mesh network interface. The routers 206 also route traffic across the mesh network 202. The end devices 208 are devices that can communicate using the mesh network 202, but lack the capability, beyond simply forwarding to its parent router 206, to route traffic in the mesh network 202. For example, a battery-powered sensor is one type of end device 208. Each Wi-Fi device 210 includes a Wi-Fi network interface for communication over a Wi-Fi network. The Wi-Fi devices 210 and/or the Ethernet devices 214 can include home automation devices as well as devices that include applications to control Matter devices (e.g., a smartphone, a tablet, a network-connected speaker).

An ecosystem controller 216a (e.g., a Matter controller) can include the border router 106, which in turn, is included in the wireless mesh network 202. The border router 106 includes a mesh network interface for communication over the mesh network 202 and a Wi-Fi network interface for communication over the Wi-Fi network 204, or the border router 106 uses the Wi-Fi network interface of the ecosystem controller 216a for communication over the Wi-Fi network 204. The border router 106 routes packets between devices in the wireless mesh network 202 and the access point 110, which can forward packets to other devices in the HAN 200. The border router 106 also routes packets between devices in the mesh network 202 and external network nodes (e.g., the cloud service 112) via the external network 108, such as the Internet, through a home router or access point 110.

The HAN 200 includes one or more ecosystem controllers 216 that provide an interface between devices from an ecosystem vendor and the access point 110. For example, the ecosystem controller 216a provides an interface between the mesh network 202 (a Thread network) and the access point 110. Optionally, the HAN 200 may include other ecosystem controllers, such as ecosystem controller 216b, to interface to devices from other ecosystem vendors. Additionally, other, devices from another IoT network 218 (e.g., non-Matter compatible ecosystem devices) can be connected to the access point 110 by a Matter gateway 220 that provides connectivity for Matter-capable applications to devices in the other IoT network 218.

The devices in the mesh network 202, the Wi-Fi device(s) 210, the Ethernet device(s) 214, the ecosystem controllers 216, and Matter gateway 220 use standard IP routing configurations to communicate with each other through transport protocols such as the User Datagram Protocol (UDP) or the Transmission Control Protocol (TCP).

Securing Return Communication Through Application Uniform Resource Locators

In order to commission a joining device (target device) the commissioning device (initiator) needs to recover a secret and/or other associated data (payload-of-interest, Responder Payload) from the responder so that the target device can be further accessed. The responder is any suitable device that can store and provide the secret and/or other associated data (e.g., a cloud service 112, a wireless network device, a border router 106, a hub 120, an internet client device, a smartphone, or the like). The initiator trusts the responder to provide it an Initiator Response URL, which, if accessed, would convey the necessary payload-of-interest. The responder may or may not trust the initiator depending on the content of the Responder Access URL (as described below with respect to FIG. 5). The initiator obtains a Responder-Access URL that it expects to be trustworthy. Obtaining the Responder-Access URL will trigger an eventual response of the payload-of-interest back to the initiator through an augmented version of the Initiator Response URL (Augmented Initiator Response URL) conveyed from the initiator to the responder. The initiator trusts the responder to provide it the correct payload-of-interest (e.g., "provide_access_1_e074ec02eb2b452322736f565b90236"), and the payload-of-interest must be infeasible to recover by any entity other than the initiator and responder. Encryption and authentication ensure that tampering of the payload-of-interest between the responder and the initiator is detectable.

Figure 3:
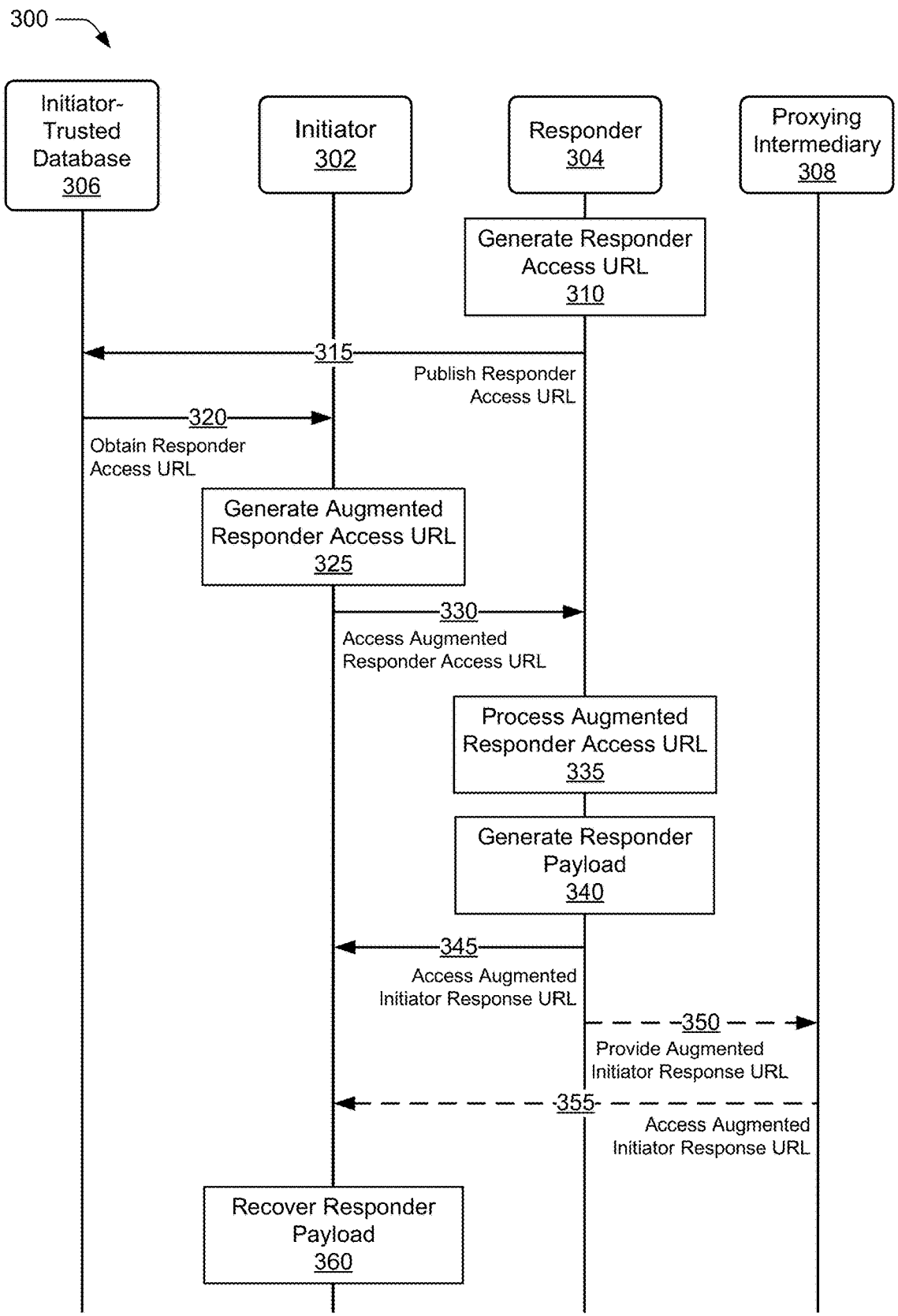
FIG. 3 illustrates example data and control transactions between devices in accordance with aspects of securing return communication through application uniform resource locators.

FIG. 3 illustrates example data and control transactions between entities with which various aspects of securing return communication through application uniform resource locators can be implemented. Initial parameters of the commissioning process are defined a priori (e.g., defined in the standards document specifying a communications protocol). In aspects, a symmetric cryptosystem supporting authenticated encryption with associated data (AEAD) is used for message encryption and authentication to be used by both the initiator and responder. A key length is KL bits long. An asymmetric cryptosystem supporting Diffie-Hellman (DH) or Elliptical Curve Diffie-Hellman (ECDH) is used by both the initiator and the responder. A key derivation function (KDF) algorithm is specified to be used by the initiator and the responder.

At 310, a responder 304 generates a fixed Responder Access URL (e.g., https://responder.example.com/responder_access?responder_pk=BHi7mFxXpV1GRQ1 hM75Ro chDaMm9m7g-Ha7CsCCPNb71XdXRmdlD3xF WpIJsY7ZiXZ1YiYv3fOCgiThi4htGdjk%3D). The responder 304 may be a cloud service or web service (e.g. the cloud service 112), a device on a home area network (e.g., a wireless network device 102, a border router 102, a hub 120, or the like), or an application on a commissioning device (e.g., an internet client 116, smartphone, or the like). For example, the generation of the Responder Access URL includes the responder 304 generating a long-lived key pair for the Responder Access URL and making the Responder Access URL accessible. In aspects, the Responder Access URL is fixed and contains, within its query field, a well-known encoding of a public key associated with a private key held by the responder 304. Optionally or additionally, the Responder Access URL may, within its format, convey a cryptographic suite type which is associated with the public key. In other aspects, instead of a well-known encoding of the public key itself (such as direct key in a format, or a certificate embedding that key), there may be other identifiers that, when combined, allow an initiator 302 to determine the location of the public key associated with the responder 304. For example, information encoded in the Responder Access URL or known to the initiator 302 from other interactions with the joining device, could allow the initiator 302 to recover the key separately from the URL, such as from the same initiator-trusted database 306 or a different database than the one where the Responder Access URL is obtained.

At 315, the responder 304 publishes the Responder Access URL to a trusted location accessible by an initiator 302. For example, the responder 304 stores the Responder Access URL in an initiator-trusted database 306 such as a database maintained by the manufacturer of the joining device or another accessible service provider.

At 320, the initiator 302 obtains the Responder Access URL from the initiator-trusted database 306. At 325, the initiator 302 generates an Augmented Responder Access URL, for example:

from the initially obtained Responder Access URL. The generation of the Augmented Responder Access URL is described below with respect to FIG. 4. At 330, the initiator accesses the generated Augmented Responder Access URL at the responder 304.

At 335, in response to the initiator 302 accessing the Augmented Responder Access URL, the responder 304 processes the Augmented Responder Access URL to authenticate the Augmented Responder Access URL and generate a Responder Payload as described below with respect to FIG. 5. At 340, the responder generates an Augmented Initiator Response URL to convey the Responder Payload to the initiator 302 as described below with respect to FIG. 6. For example, the responder 304 extracts the Initiator Response URL from the Initiator Payload (e.g., https://initiator.example.com/initiator_response?example_token=s4i0yhcQUxci6-Z0gKOFAA%3D%3D&example_field=7144 provide_access_1e074ec02eb2b452322736f565b90236), and the responder 304 augments the extracted Initiator Response URL to produce the Augmented Initiator Response URL.

At 345, the initiator 302 can access the Augmented Initiator Response URL directly from the responder 304. In an alternative, at 350, the responder 304 provides the Augmented Initiator Response URL to a proxying intermediary 308, and at 355, the initiator 302 accesses the Augmented Initiator Response URL from the proxying intermediary 308. At 360, the initiator 302 recovers the Responder Payload, as described below with respect to FIG. 7, to complete the commissioning process.

Figure 4:
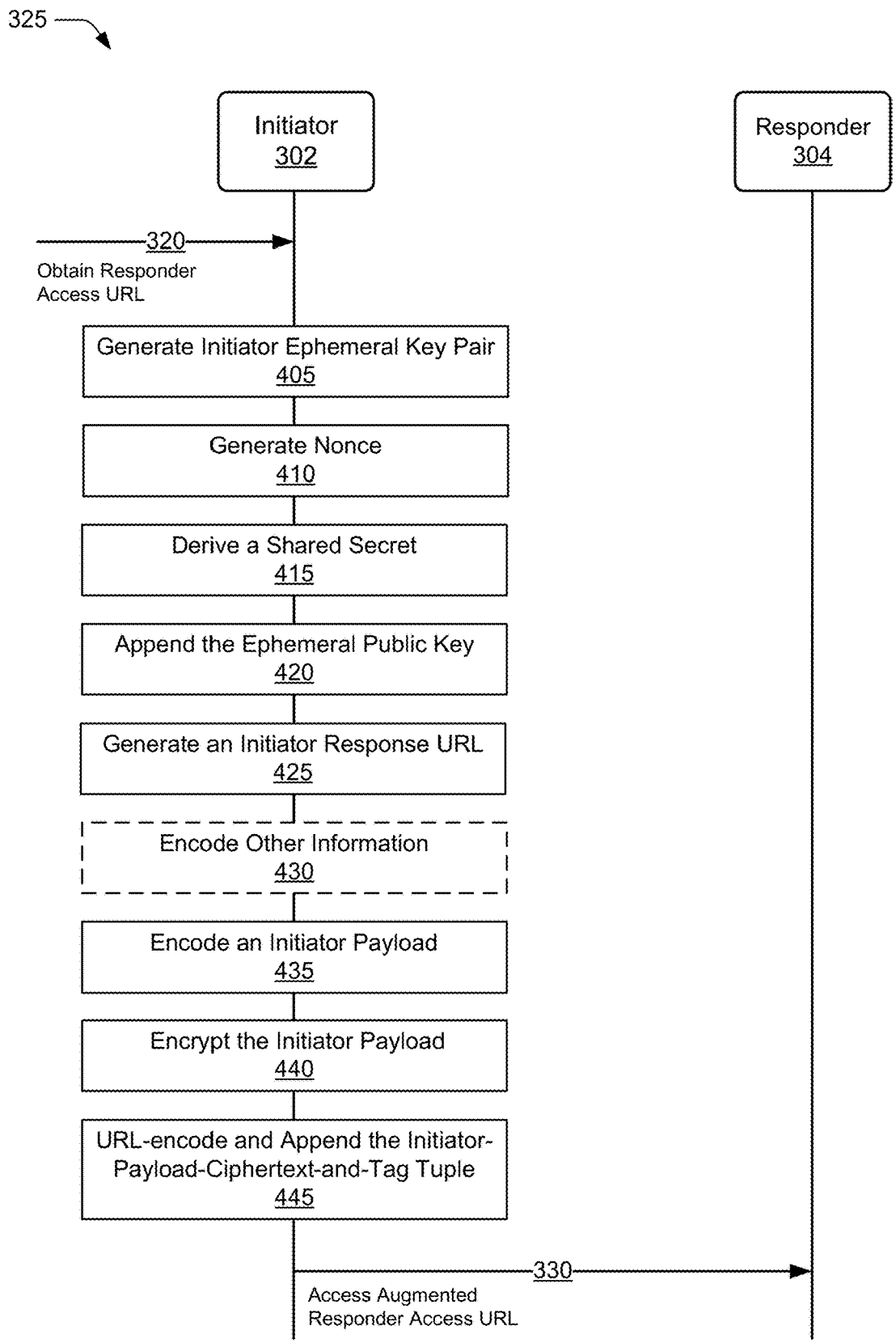
FIG. 4 illustrates example data and control transactions between devices in accordance with aspects of securing return communication through application uniform resource locators.

FIG. 4 illustrates example data and control transactions between entities for generation of the Augmented Responder Access URL (at 325) with which various aspects of securing return communication through application uniform resource locators can be implemented. The operations described in relation to FIG. 4 use the cryptographic suite and key length, KL, which are determined a priori, as described above.

At 405, the initiator 302 generates an initiator ephemeral asymmetric cryptography key pair compatible, for the purposes of Diffie-Hellman (DH) or Elliptical Curve Diffie-Hellman (ECDH), with the cryptographic suite of the public key of the responder 304 that was generated at 310 and obtained with the Responder Access URL at 320. The initiator ephemeral key pair includes an ephemeral private key and an ephemeral public key. At 410, the initiator 302 generates a random nonce (e.g., fa:cc:6e:9c:3b:cc:54:00:82:62:eb:b4:b3) satisfactory for use in an AEAD (authenticated encryption with associated data) symmetric cryptography algorithm. The initiator 302 encodes the generated nonce in a suitable representation, such as pre-determined query arguments appended to the query present in the Responder Access URL.

At 415, using DH or ECDH, the initiator 302 derives a shared secret (e.g., a4:84:e5:7b:3d:96:93:1c:a1:7e:2f:d7:55:9d:de:43:be:a8:e6:77:03:08:f7:fd:0a:01:32:23:2f:fb:e0:0 b)

--- https://responder.example.com/responder_access?responder_pk=BHi7mFxXpV1GRQlhM7
5RochDaMm9m7g-Ha7CsCCPNb71XdXRmdlD3xFWpIJsY7ZiXZ1YiYv3fOCgiThi4htGd
jk%3D&nonce=-sxunDvMVACCYuu0sw%3D%3D&initiator_pk=BO5nDogkrc-9AB-Yl0
c3UEMCaBg3p8BzCN8sWo7AmmBaq9SPgAhVLZKfeDrJ7CWgB2eGLeUFQAwi3UKai
fiT6To%3D&initiator_payload=pDPar2dVBdMwj2gbs4iPCENuoWqAmfhBtdqfaFE1Gg2
KY4pqKWJ7xs4oHrgo9n1YTPBx3bP8fdoysT4_gbu3JJNzgGSG1Aim0F6-J16DfPZl4P2N
7c54KS2F2KEjecUVE_6YK65kBwoIq6j7gxFz-qdMqcvP3GAWptz1XE2RkgnP-AKw6g8
yHacwm1drOB50zOFkjzw0eC3HPRrsvTQ1xoHDBSH6-bsTUBPjnWbh using the ephemeral private key generated at 405 and the responder public key obtained at 320. This derived shared secret is a session key agreement. In a first alternative, the initiator 302 uses the nonce, and a salt and/or other information, as well as the shared secret, and a Key Derivation Function (e.g. HMAC-based Extract-and-Expand Key Derivation Function (HKDF)) to generate twice the key length of bits of key material from the shared secret, where half of the bits are an Initiator-to-Responder key (e.g., 20:05:d4:00:0c:72:9f:57:34:30:97:1f26:26:ef:90) and the other half of the bits are a Responder-to-Initiator key (e.g., c5:12:b8:41:cc:e6:44:64:78:6c:89:ab:d8:ae:20:52). In a second alternative, the initiator 302 uses a Key Derivation Function to generate a single symmetric key of KL bits that is generated and reused in both directions between the initiator 302 and the responder 304. Optionally or additionally, the initiator 302 may use the nonce, and a salt and/or other information, as well as the shared secret, to generate the single symmetric key.

At 420, the initiator 302 appends the ephemeral public key, in a format suitable to use by the responder 304, to the query present in the Responder Access URL. For example, the initiator 302 appends the ephemeral public key in a format such as URL-encoded, URL-safe base64 of a Distinguished Encoding Rule (DER) or a raw version of the public key.

At 425, the initiator 302 generates a suitable Initiator Response URL (e.g., https://initiator.example.com/initiator_response?example_token=s4i0yhcQUxci6-Z0gKOFAA%3D%3D&example_field=7144) to be accessed with the response, including any suitable data the initiator 302 needs to have passed back to itself on the response. Optionally at 430, the initiator 302 encodes other suitable information to query the responder 304 as a Responder Query (e.g., provide_access_1e074ec02eb2b452322736f565b90236). At 435, the initiator 302 encodes a payload called the Initiator Payload (e.g., https://initiator.example.com/initiator_response?example_token=s4i0yhcQUxci6-Z0gKOFAA%3D%3D&example_field=7144 provide_access_1e074ec02eb2b452322736f565b90236) that is understandable by the responder 304, and includes the Initiator Response URL, and, if used, the optional Responder Query.

At 440, the initiator 302 encrypts the Initiator Payload into an Initiator-Payload-ciphertext-and-tag tuple using the pre-determined AEAD algorithm (e.g. Advanced Encryption Standard-Counter with CBC-MAC (AES-CCM) as defined in NIST 800-38C, Recommendations for Block Cipher Mode of Operation: The CCM Mode for Authentication and Confidentiality, section 6.1). The encipherment key used is either the Initiator-to-Responder key or the single symmetric key (as described at 415), depending on the session key agreement method. The nonce used for the encryption is the nonce value generated at 410. The additional data used for the encryption is the entire augmented Responder Access URL, up until the end of the query (omitting a fragment field) after it was augmented with the nonce (at 410) and initiator ephemeral public key (at 420). The plaintext to encrypt is the Initiator Payload binary string (encoded at 435).

At 445, the initiator 302 URL-encodes and appends, to the query present in the Responder Access URL, the Initiator-Payload-ciphertext-and-tag tuple, in a format suitable to use by the responder 304, such as URL-encoded URL-safe base64 of their concatenation, in a pre-defined URL query argument. The initial Responder Access URL is now ready to be used as the Augmented Responder Access URL at 330. The initiator 302 can access the Augmented Responder Access URL using a web browser or any other suitable technique that can process the scheme of the Augmented Responder Access URL.

Figure 5:
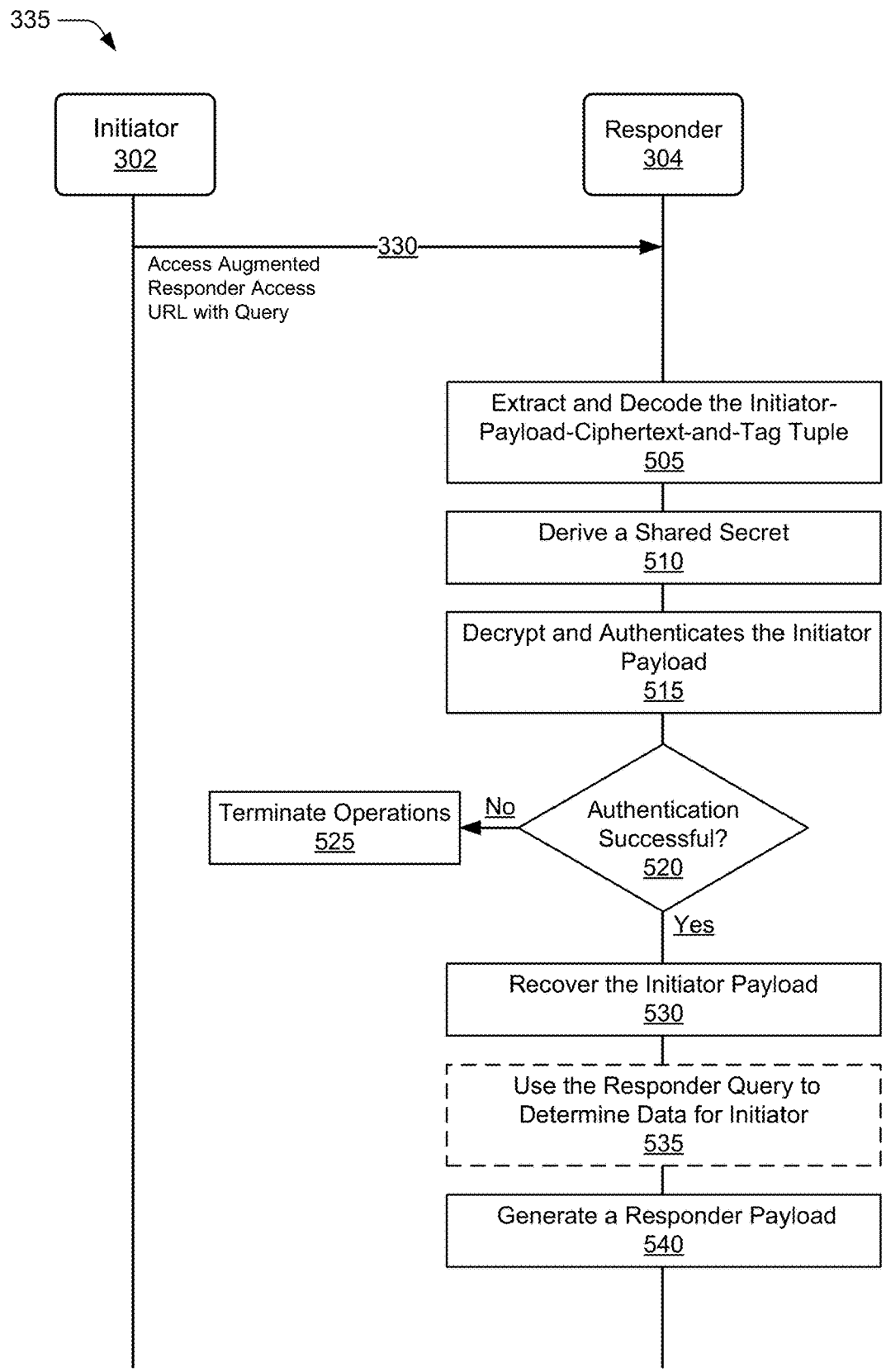
FIG. 5 illustrates example data and control transactions between devices in accordance with aspects of securing return communication through application uniform resource locators.

FIG. 5 illustrates example data and control transactions between entities for processing of the Augmented Responder Access URL (at 335) with which various aspects of securing return communication through application uniform resource locators can be implemented. The operations described in relation to FIG. 5 use the cryptographic suite and key length, KL, which are determined a priori, as described above.

At 505, the responder 304 extracts and decodes the Initiator-Payload-ciphertext-and-tag tuple and removes it from the query. The responder 304 discards the fragment field from the received Augmented Responder Access URL. The Initiator-Payload-ciphertext-and-tag tuple is the last item of the query. The responder 304 saves the additional data URL (the Responder Access URL with nonce and initiator ephemeral public key added), described at 440. The responder 304 extracts the nonce from the additional data URL according to the pre-determined encoding format. The responder 304 extracts the initiator ephemeral public key from the additional data URL according to the predetermined encoding format and saves the Initiator-Payload-ciphertext-and-tag.

At 510, using DH or ECDH, the responder 304 derives the shared secret using the private key associated with its fixed public key (the one associated with the Responder Access URL employed so far, and shared with the initiator 302 at 320) and the initiator ephemeral public key extracted at 505. This is the responder's side of the session key agreement and is performed employing a method symmetrical to the one used at 415. In a first alternative, the responder 304 uses the nonce, and a salt and/or other information, as well as the shared secret, a Key Derivation Function (e.g. HKDF) to generate twice the key length of bits of key material (2*KL) from the shared secret, where half of the bits are an Initiator-to-Responder key and the other half of the bits are a Responder-to-Initiator key. In a second alternative, the responder 304 uses a Key Derivation Function to generate a single symmetric key of length KL bits that is generated and reused in both directions between the initiator 302 and the responder 304.

At 515, the responder 304 decrypts and authenticates the Initiator Payload using the pre-determined AEAD algorithm (e.g., AES-CCM as defined in NIST 800-38C sec 6.1). The nonce used for the decryption is the nonce extracted at 505. The additional data to use is the URL saved at 505. The ciphertext to use is ciphertext extracted at 505. The tag to validate is the tag extracted at 505. The key to use is the Initiator-to-Responder key obtained at 510.

At 520, the responder 304 determines if the authentication was successful. If the authentication fails, the responder 304 terminates further operations, at 525 and does not trust any subsequent data from the session of the initiator 302. If the authentication succeeds, the responder 304 proceeds to recover the Initiator Payload at 530.

At 530, the responder 304 recovers the Initiator Payload by extracting the Initiator Response URL from the Initiator Payload and extracting the Responder Query from the Initiator Payload if the Responder Query is present. Optionally at 535, if a Responder Query is present, the responder 304 uses the Responder Query along with the rest of the Responder Access URL to determine what information to convey back to the initiator 302 when the Initiator Response URL is accessed. At 540, the responder 304 generates a Responder Payload to send back to the initiator 302.

Figure 6:
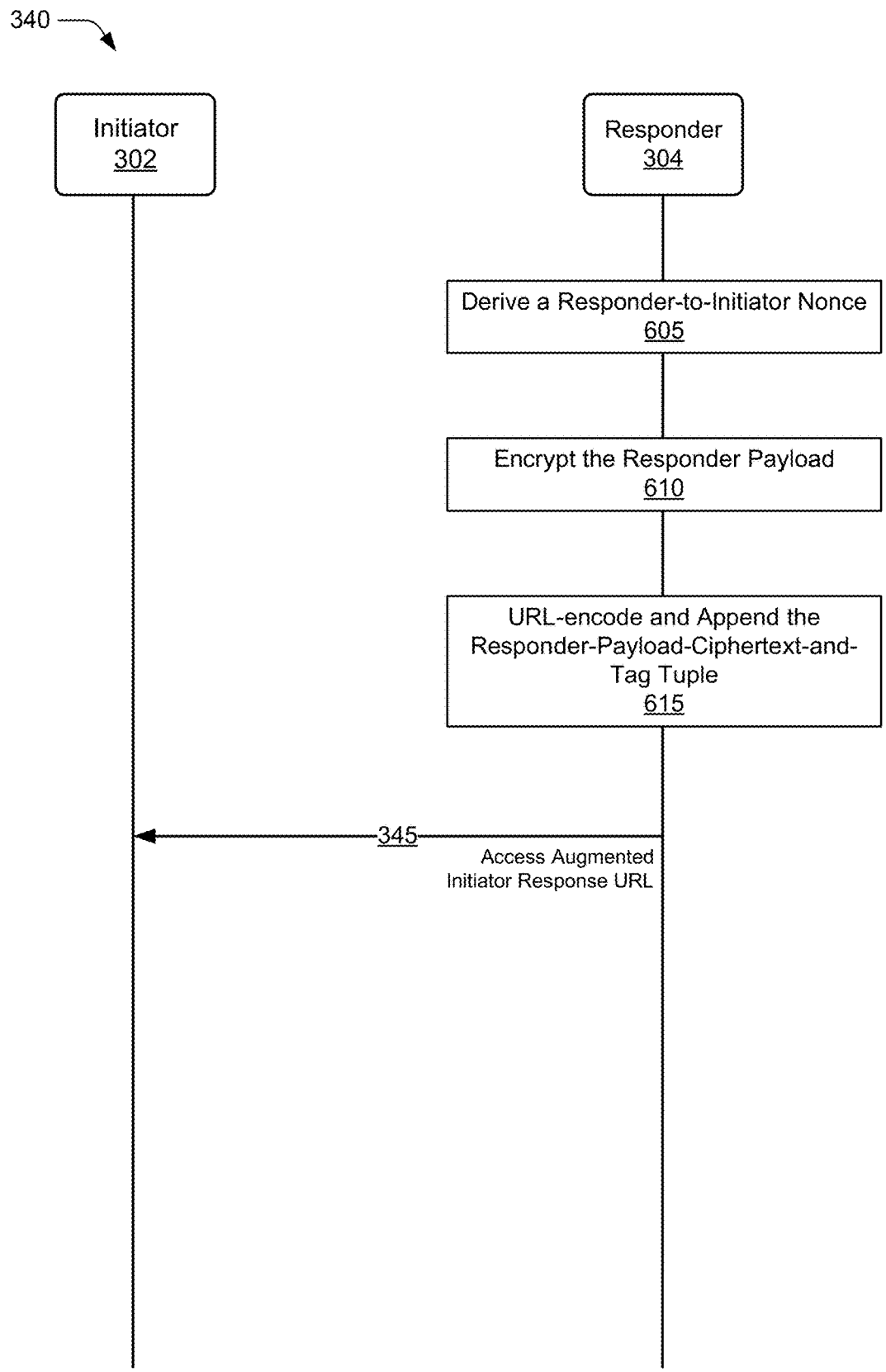
FIG. 6 illustrates example data and control transactions between devices in accordance with aspects of securing return communication through application uniform resource locators.

FIG. 6 illustrates example data and control transactions between entities for generating a Responder Payload (at 340) with which various aspects of securing return communication through application uniform resource locators can be implemented. The operations described in relation to FIG. 6 use the cryptographic suite and key length, KL, which are determined a priori, as described above.

At 605, if a single symmetric key is used, the responder 304 derives a Responder-to-Initiator nonce (e.g., 05:33:91: 63:c4:33:ab : ff: 7d: 9d: 14:4b: 4c) using a method expected by both the initiator and the responder, such as by inverting all the bits (e.g., exclusive-or (XOR) 0xFF with each octet) of the nonce extracted, at 505, to be used as the Responder-to-Initiator nonce. The Responder-to-Initiator nonce is not transmitted, as it can be computed deterministically by the initiator 302 when processing the Augmented Initiator Response URL.

At 610, the responder 304 uses the pre-determined AEAD algorithm (e.g. AES-CCM as defined in NIST 800-38C sec 6.1) and encrypts the Responder Payload into a Responder-Payload-ciphertext-and-tag tuple. The encipherment key used is either the Responder-to-Initiator key or the single symmetric key (derived at 510), depending on the session key agreement method. The nonce used for the encryption is the Responder-to-Initiator nonce value generated at 605. The responder 304 uses the entire Initiator Response URL up until the end of the query (omitting the fragment field) as the additional data during the encryption. The responder 304 encrypts the Responder Payload (from 535) as the plaintext to encrypt.

At 615, the responder 304 URL-encodes and appends the Responder-Payload-ciphertext-and-tag tuple, in a format suitable to use by the initiator 302, such as URL-encoded URL-safe base64 of their concatenation, in a pre-defined URL query argument appended to the query present in the Initiator Response URL. The initial Responder Access URL is now ready to be used as the Augmented Responder Access URL (e.g., https://initiator.example.com/initiator_response?example_token=s4i0yhcQUxci6-Z0gKOFAA%3D%3D&example_field=7144&responder_payload=Wl7BNkQU-Hsz5E14Gs5WN19ID0sxjJgz g_FTRybnsKGxd2IyxKQp YwDGdlblkKoXPO0befTrxTOW4UvsPjgO) at 330.

The responder 304 can convey the Augmented Initiator Response URL using a browser or other client capable of handling the scheme and authority of that URL, perhaps going through a variety of out-of-band means and hops. The Augmented Initiator Response URL is valid to use for as long as the initiator 302 that created the Initiator Response URL prior to its augmentation into the Augmented Initiator Response URL has access to the underlying ephemeral key pair and can recover the associated cryptographic contexts from the data the initiator 302 initially injected in the Initiator Response URL. Optionally or additionally, an entity other than the responder 304 can access the Augmented Initiator Response URL. The Augmented Initiator Response URL that contains the Responder Payload may be conveyed across several different hops across applications and networks until an endpoint is reached that is known to be able to access the URL given its scheme and authority.

Figure 7:
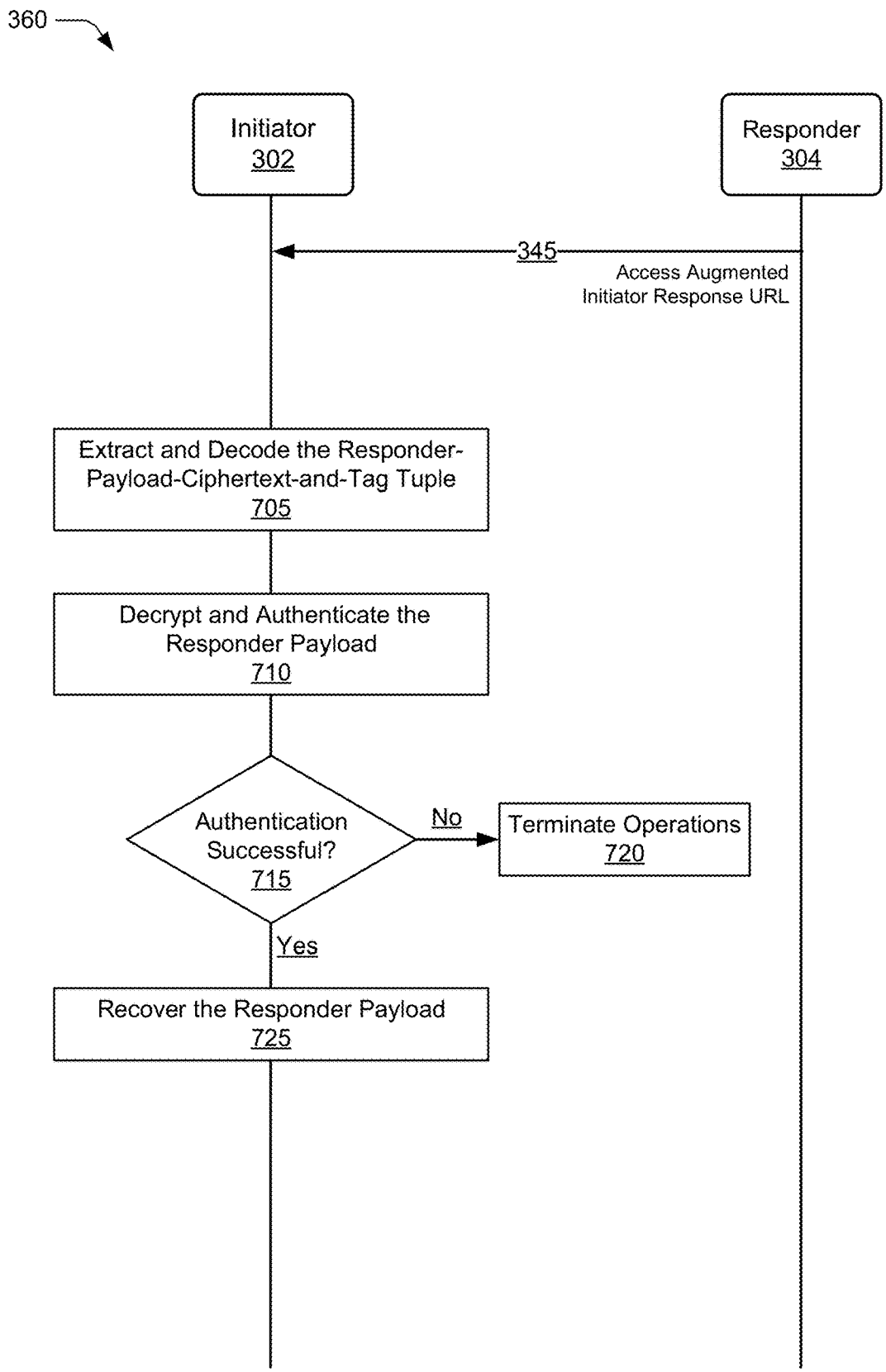
FIG. 7 illustrates example data and control transactions between devices in accordance with aspects of securing return communication through application uniform resource locators.

FIG. 7 illustrates example data and control transactions between entities for processing of the Augmented Initiator Response URL (at 360) with which various aspects of securing return communication through application uniform resource locators can be implemented. The operations described in relation to FIG. 7 use the cryptographic suite and key length KL, which are determined a priori, as described above.

At 705, the initiator 302 extracts and decodes the Responder-Payload-ciphertext-and-tag tuple, for example:

5a:5e:c1:36:44:14:f8:7b:33:e4:4d:78:1a:ce:56:36:5f:48:0f:46:31:8c:98:33:83:f1:53:47:26:e7
:b0:a1:b1:77:62:32:c4:a4:29:63:00:c6:76:56:e5:90:aa:17:3c:ed:1b:79:f4:eb:c5:33:96:e1:4b:e
c:3e:38:0e and removes it from the query. The initiator 302 discards the fragment field from the received Augmented Initiator Response URL. The initiator 302 verifies the remaining portion of the Augmented Initiator Response URL without the Responder-Payload-ciphertext-and-tag tuple to determine it matches an initially generated Initiator Response URL. The initiator 302 uses the remaining portion of the Augmented Initiator Response URL as the additional data during authenticated decryption. The initiator 302 recovers the expected nonce and the necessary keys to match those generated at 410 and 415 based on lookup indexed from data embedded within the recovered Initiator Response URL. The initiator 302 saves the Response Payload ciphertext and tag.

At 710, the initiator 302 decrypts and authenticates the Responder Payload using the pre-determined AEAD algorithm (e.g., AES-CCM as defined in NIST 800-38C sec 6.1). The nonce used for the decryption is the nonce extracted at 705. The additional data to use is the URL saved at 705. The ciphertext to use is ciphertext extracted at 705. The tag to validate is the tag extracted at 705. The Key to use is the Initiator-to-Responder key obtained at 705.

At 715, the initiator 302 determines if the authentication was successful. If the authentication fails, the initiator 302 terminates further operations at 720 and does not trust any subsequent data from the session of the responder 304. If the authentication succeeds, the initiator 302 proceeds to recover the Responder Payload (e.g., provide_access_1e074ec02eb2b452322736f565b90236) at 725.

Example Methods

Example methods 800 and 900 are described with reference to FIGS. 8 and 9 in accordance with one or more aspects of securing return communication through application uniform resource locators. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like. The order in which the method blocks are described is not intended to be construed as a limitation, and any number of the described method blocks can be combined in any order or skipped to implement a method or an alternate method.

Figure 8:
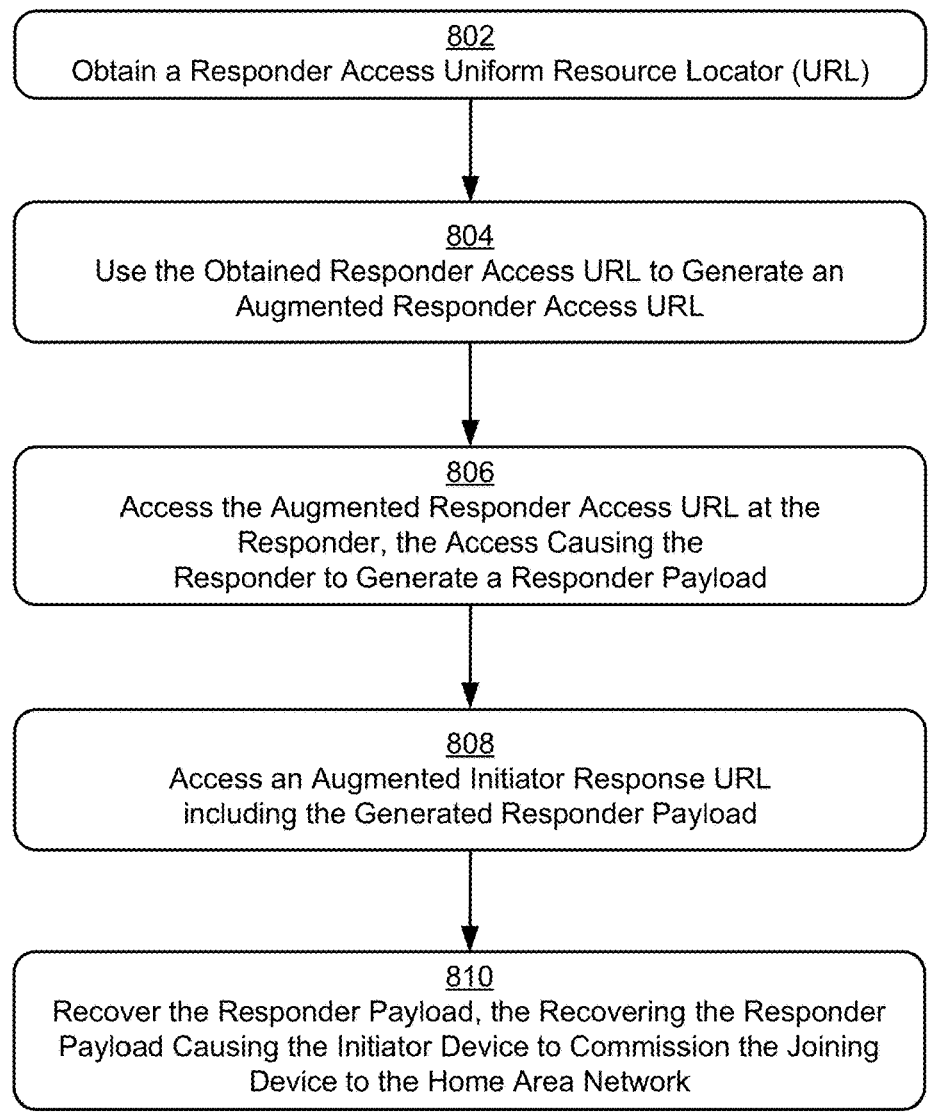
FIG. 8 illustrates an example method of securing return communication through application uniform resource locators as in accordance with aspects of the techniques described herein.

FIG. 8 illustrates example method(s) 800 of securing return communication through application uniform resource locators as generally related to an initiator device commissioning a joiner device to a home area network. At block 802, an initiator device (e.g., the initiator 302) obtains a Responder Access Uniform Resource Locator (URL). For example, the initiator device 302 obtains the Responder Access Uniform Resource Locator (URL) from an initiator-trusted database (e.g., the initiator-trusted database 306), as described above with respect to FIGS. 3 and 4.

At block 804, the initiator device uses the obtained Responder Access URL, to generate an Augmented Responder Access URL. For example, initiator device uses the obtained Responder Access URL to generate the Augmented Responder Access URL as described with respect to FIG. 4, above.

At block 806, the initiator device accesses the Augmented Responder Access URL at a responder (e.g., the responder 304) causing the responder to generate a Responder Payload. For example, the initiator accesses the Augmented Responder Access URL at the responder at 330.

At block 808, the initiator device accesses an Augmented Initiator Response URL including the generated Responder Payload. For example, the initiator device accesses the Augmented Initiator Response URL including the generated Responder Payload directly from the responder at 345 or via a proxying intermediary (e.g., the proxying intermediary 308) as shown at 350 and 355.

At block 810, the initiator device recovers the Responder Payload, causing the initiator device to commission the joining device to the home area network. For example, the initiator device uses the recovered Responder Payload to commission the joining device to join the home area network (e.g., the home area network 200).

Figure 9:
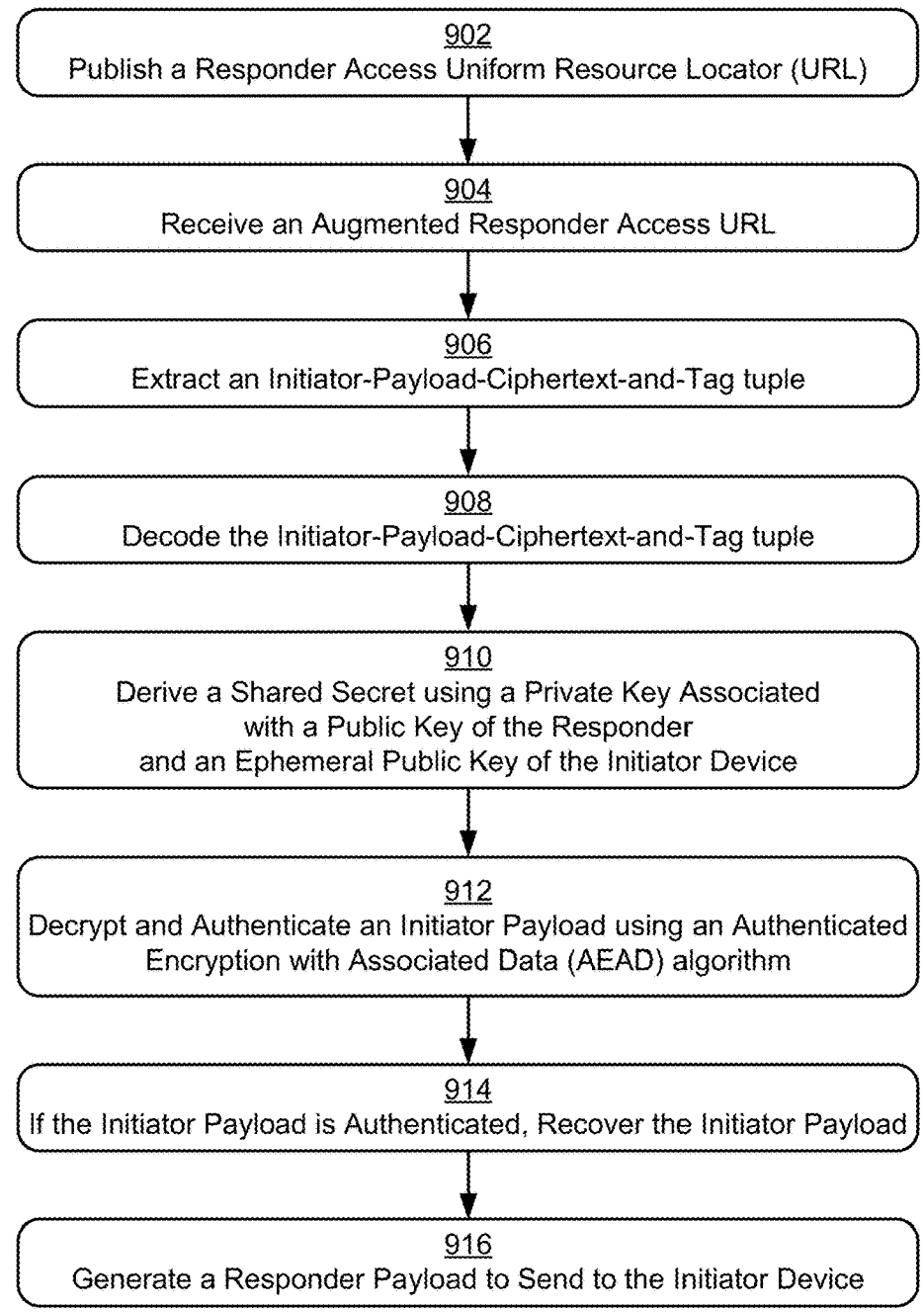
FIG. 9 illustrates an example method of securing return communication through application uniform resource locators as in accordance with aspects of the techniques described herein.

FIG. 9 illustrates example method(s) 900 of securing return communication through application uniform resource locators as generally related to a responder generating commissioning information for an initiator device to commission a joiner device to a home area network. At block 902, the responder publishes a Responder Access Uniform Resource Locator (URL). For example, the responder (e.g., the responder 304) publishes, at 315, a Responder Access Uniform Resource Locator (URL). The responder can publish the Responder Access URL to a data base (e.g., the initiator-trusted database 306) that is trusted by the initiator device (e.g., the initiator device 302).

At block 904, the responder receives, from the initiator device, an Augmented Responder Access URL. For example, the initiator device accesses an Augmented Responder Access URL at the responder at 330 that is based on the Responder Access URL received by the initiator device at 320.

At block 906, the responder extracts a Initiator-Payload-ciphertext-and-tag tuple. For example, the responder extracts a Initiator-Payload-ciphertext-and-tag tuple as described at 505.

At block 908, the responder decodes the Initiator-Payload-ciphertext-and-tag tuple. For example, the responder decodes the Initiator-Payload-ciphertext-and-tag tuple as described at 505.

At block 910, the responder derives a shared secret using a private key associated with a public key of the responder and an ephemeral public key of the initiator device. For example, the responder derives a shared secret using a private key associated with a public key of the responder and an ephemeral public key of the initiator device as described at 510.

At block 912, the responder decrypts and authenticates an Initiator Payload using an authenticated encryption with associated data (AEAD) algorithm. For example, the responder decrypts and authenticates an Initiator Payload using an authenticated encryption with associated data (AEAD) algorithm, as described at 515.

At block 914, if the Initiator Payload is authenticated, the responder recovers the Initiator Payload. For example, if the responder is able to authenticate the Initiator Payload, the responder recovers the Initiator Payload, as described at 530. If the authentication fails, the responder terminates operations on the Augmented Responder Access URL.

At block 916 the responder generates a Responder Payload to send to the initiator device. For example, based on the successful authentication and extraction, the responder generates a Responder Payload to send to the initiator device. The generated Responder Payload provides information to the initiator device to complete commissioning the responder to the home area network 200.

Example Environments and Devices

Figure 10:
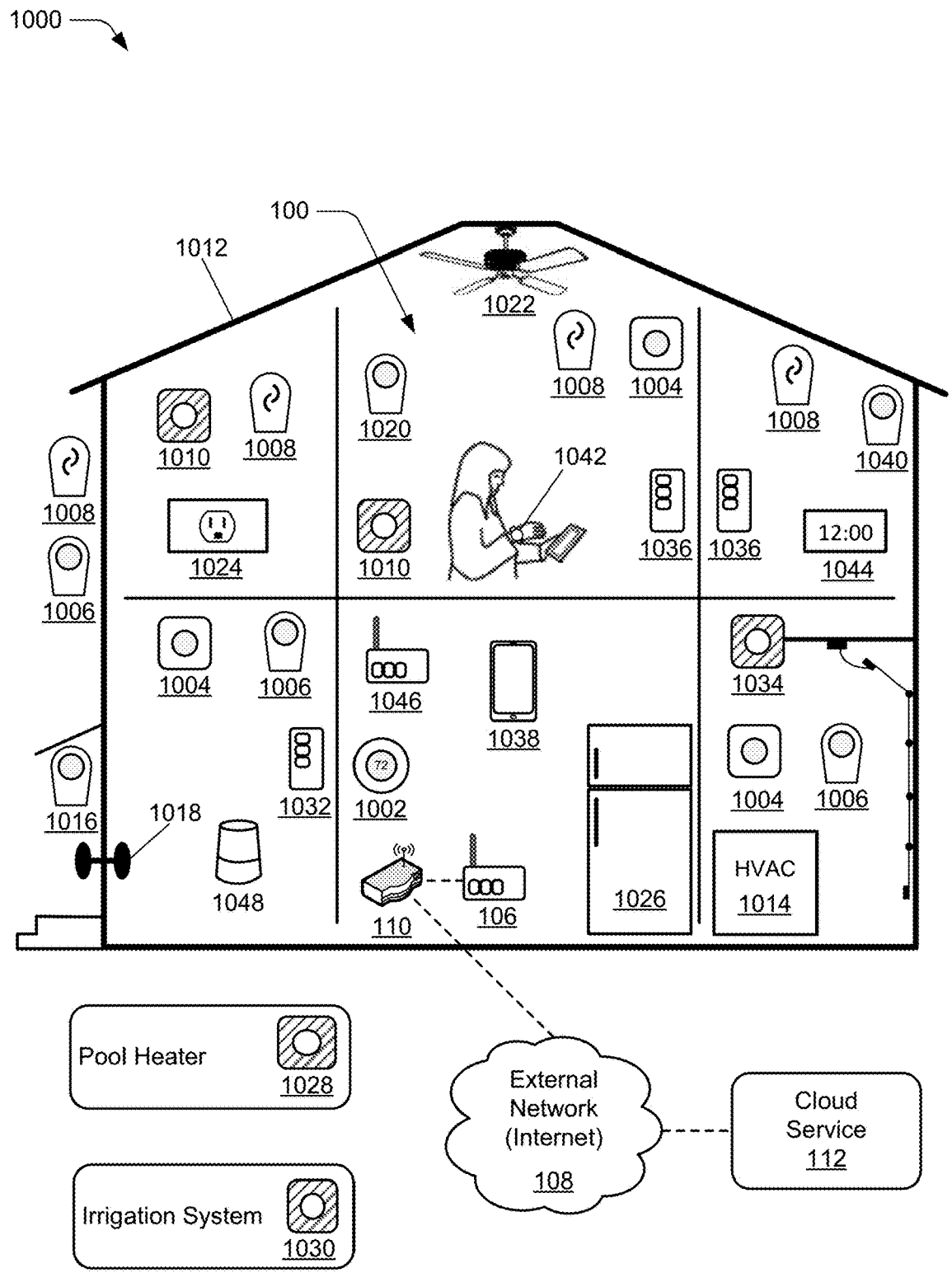
FIG. 10 illustrates an example environment in a which a home area network can be implemented in accordance with aspects of the techniques described herein.

FIG. 10 illustrates an example environment 1000 in which a home area network 200, as described with reference to FIG. 2, and aspects of securing return communication through application uniform resource locators can be implemented. Generally, the environment 1000 includes the home area network (HAN) 200 implemented as part of a home or other type of structure with any number of wireless and/or wired network devices that are configured for communication in a wireless network. For example, the wireless network devices can include a thermostat 1002, hazard detectors 1004 (e.g., for smoke and/or carbon monoxide), cameras 1006 (e.g., indoor and outdoor), lighting units 1008 (e.g., indoor and outdoor), and any other types of wireless network devices 1010 that are implemented inside and/or outside of a structure 1012 (e.g., in a home environment). In this example, the wireless network devices can also include any of the previously described devices, such as a border router 106, as well as any of the devices implemented as a router device 206, an end device 208, an ecosystem controller 216, and/or a Matter gateway 220.

In the environment 1000, any number of the wireless network devices can be implemented for wireless interconnection to wirelessly communicate and interact with each other. The wireless network devices are modular, intelligent, multi-sensing, network-connected devices that can integrate seamlessly with each other and/or with a central server or a cloud-computing system to provide any of a variety of useful automation objectives and implementations. An example of a wireless network device that can be implemented as any of the devices described herein is shown and described with reference to FIG. 11.

In implementations, the thermostat 1002 may include a Nest® Learning Thermostat that detects ambient climate characteristics (e.g., temperature and/or humidity) and controls a HVAC system 1014 in the home environment. The learning thermostat 1002 and other network-connected devices "learn" by capturing occupant settings to the devices. For example, the thermostat learns preferred temperature set-points for mornings and evenings, and when the occupants of the structure are asleep or awake, as well as when the occupants are typically away or at home.

A hazard detector 1004 can be implemented to detect the presence of a hazardous substance or a substance indicative of a hazardous substance (e.g., smoke, fire, or carbon monoxide). In examples of wireless interconnection, a hazard detector 1004 may detect the presence of smoke, indicating a fire in the structure, in which case the hazard detector that first detects the smoke can broadcast a low-power wake-up signal to all of the connected wireless network devices. The other hazard detectors 1004 can then receive the broadcast wake-up signal and initiate a high-power state for hazard detection and to receive wireless communications of alert messages. Further, the lighting units 1008 can receive the broadcast wake-up signal and activate in the region of the detected hazard to illuminate and identify the problem area. In another example, the lighting units 1008 may activate in one illumination color to indicate a problem area or region in the structure, such as for a detected fire or break-in, and activate in a different illumination color to indicate safe regions and/or escape routes out of the structure.

In various configurations, the wireless network devices 1010 can include an entryway interface device 1016 that functions in coordination with a network-connected door lock system 1018, and that detects and responds to a person's approach to or departure from a location, such as an outer door of the structure 1012. The entryway interface device 1016 can interact with the other wireless network devices based on whether someone has approached or entered the smart-home environment. An entryway interface device 1016 can control doorbell functionality, announce the approach or departure of a person via audio or visual means, and control settings on a security system, such as to activate or deactivate the security system when occupants come and go. The wireless network devices 1010 can also include other sensors and detectors, such as to detect ambient lighting conditions, detect room-occupancy states (e.g., with an occupancy sensor 1020), and control a power and/or dim state of one or more lights. In some instances, the sensors and/or detectors may also control a power state or speed of a fan, such as a ceiling fan 1022. Further, the sensors and/or detectors may detect occupancy in a room or enclosure and control the supply of power to electrical outlets or devices 1024, such as if a room or the structure is unoccupied.

The wireless network devices 1010 may also include connected appliances and/or controlled systems 1026, such as refrigerators, stoves and ovens, washers, dryers, air conditioners, pool heaters 1028, irrigation systems 1030, security systems 1032, and so forth, as well as other electronic and computing devices, such as network-connected televisions, network-connected media streaming devices, entertainment systems, computers, intercom systems, garage-door openers 1034, ceiling fans 1022, control panels 1036, and the like. When plugged in, an appliance, device, or system can announce itself to the home area network as described above and can be automatically integrated with the controls and devices of the home area network, such as in the home. It should be noted that the wireless network devices 1010 may include devices physically located outside of the structure, but within wireless communication range, such as a device controlling a swimming pool heater 1028 or an irrigation system 1030.

As described above, the mesh network 202 includes a border router 106 that interfaces for communication with an external network, outside the mesh network 202. The border router 106 connects to an access point 110, which connects to the communication network 108, such as the Internet. A cloud service 112, which is connected via the communication network 108, provides services related to and/or using the devices within the HAN 200. By way of example, the cloud service 112 can include applications for connecting end user devices 1038, such as smartphones, tablets, and the like, to devices in the home area network, processing and presenting data acquired in the HAN 200 to end users, linking devices in one or more HANs 200 to user accounts of the cloud service 112, provisioning and updating devices in the HAN 200, and so forth. For example, a user can control the thermostat 1002 and other wireless network devices in the home environment using a network-connected computer or portable device, such as a mobile phone or tablet device. Further, the wireless network devices can communicate information to any central server or cloud-computing system via the border router 106, an ecosystem controller 216, a Matter gateway 220, and/or the access point 110. The data communications can be carried out using any of a variety of custom or standard wireless protocols (e.g., Wi-Fi, ZigBee for low power, 6LoWPAN, Thread, Matter, etc.) and/or by using any of a variety of custom or standard wired protocols (Ethernet, HomePlug, etc.).

Any of the wireless network devices in the HAN 200 can serve as low-power and communication nodes to create the HAN 200 in the home environment. Individual low-power nodes of the network can regularly send out messages regarding what they are sensing, and the other low-powered nodes in the environment—in addition to sending out their own messages—can repeat the messages, thereby communicating the messages from node to node (i.e., from device to device) throughout the home area network. The wireless network devices can be implemented to conserve power, particularly when battery-powered, utilizing low-powered communication protocols to receive the messages, translate the messages to other communication protocols, and send the translated messages to other nodes and/or to a central server or cloud-computing system. For example, an occupancy and/or ambient light sensor can detect an occupant in a room as well as measure the ambient light, and activate the light source when the ambient light sensor 1040 detects that the room is dark and when the occupancy sensor 1020 detects that someone is in the room. Further, the sensor can include a low-power wireless communication chip (e.g., an IEEE 802.15.4 chip, a Thread chip, a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly, using the home area network, from node to node (i.e., network-connected device to network-connected device) within the home environment as well as over the Internet to a central server or cloud-computing system.

In other configurations, various ones of the wireless network devices can function as "tripwires" for an alarm system in the home environment. For example, in the event a perpetrator circumvents detection by alarm sensors located at windows, doors, and other entry points of the structure or environment, the alarm could still be triggered by receiving an occupancy, motion, heat, sound, etc. message from one or more of the low-powered mesh nodes in the home area network. In other implementations, the home area network can be used to automatically turn on and off the lighting units 1008 as a person transitions from room to room in the structure. For example, the wireless network devices can detect the person's movement through the structure and communicate corresponding messages via the nodes of the home area network. Using the messages that indicate which rooms are occupied, other wireless network devices that receive the messages can activate and/or deactivate accordingly. As referred to above, the home area network can also be utilized to provide exit lighting in the event of an emergency, such as by turning on the appropriate lighting units 1008 that lead to a safe exit. The lighting units 1008 may also be turned-on to indicate the direction along an exit route that a person should travel to safely exit the structure.

The various wireless network devices may also be implemented to integrate and communicate with wearable computing devices 1042, such as may be used to identify and locate an occupant of the structure, and adjust the temperature, lighting, sound system, and the like accordingly. In other implementations, RFID sensing (e.g., a person having an RFID bracelet, necklace, or key fob), synthetic vision techniques (e.g., video cameras and face recognition processors), audio techniques (e.g., voice, sound pattern, vibration pattern recognition), ultrasound sensing/imaging techniques, and infrared or near-field communication (NFC) techniques (e.g., a person wearing an infrared or NFC-capable smartphone), along with rules-based inference engines or artificial intelligence techniques that draw useful conclusions from the sensed information as to the location of an occupant in the structure or environment.

In other implementations, personal comfort-area networks, personal health-area networks, personal safety-area networks, and/or other such human-facing functionalities of service robots can be enhanced by logical integration with other wireless network devices and sensors in the environment according to rules-based inferencing techniques or artificial intelligence techniques for achieving better performance of these functionalities. In an example relating to a personal health-area, the system can detect whether a household pet is moving toward the current location of an occupant (e.g., using any of the wireless network devices and sensors), along with rules-based inferencing and artificial intelligence techniques. Similarly, a hazard detector service robot can be notified that the temperature and humidity levels are rising in a kitchen, and temporarily raise a hazard detection threshold, such as a smoke detection threshold, under an inference that any small increases in ambient smoke levels will most likely be due to cooking activity and not due to a genuinely hazardous condition. Any service robot that is configured for any type of monitoring, detecting, and/or servicing can be implemented as a mesh node device on the home area network, conforming to the wireless interconnection protocols for communicating on the home area network.

The wireless network devices 1010 may also include a network-connected alarm clock 1044 for each of the individual occupants of the structure in the home environment. For example, an occupant can customize and set an alarm device for a wake time, such as for the next day or week. Artificial intelligence can be used to consider occupant responses to the alarms when they go off and make inferences about preferred sleep patterns over time. An individual occupant can then be tracked in the home area network based on a unique signature of the person, which is determined based on data obtained from sensors located in the wireless network devices, such as sensors that include ultrasonic sensors, passive IR sensors, and the like. The unique signature of an occupant can be based on a combination of patterns of movement, voice, height, size, etc., as well as using facial recognition techniques.

In an example of wireless interconnection, the wake time for an individual can be associated with the thermostat 1002 to control the HVAC system in an efficient manner so as to pre-heat or cool the structure to desired sleeping and awake temperature settings. The preferred settings can be learned over time, such as by capturing the temperatures set in the thermostat before the person goes to sleep and upon waking up. Collected data may also include biometric indications of a person, such as breathing patterns, heart rate, movement, etc., from which inferences are made based on this data in combination with data that indicates when the person actually wakes up. Other wireless network devices can use the data to provide other automation objectives, such as adjusting the thermostat 1002 so as to pre-heat or cool the environment to a desired setting and turning-on or turning-off the lights 1008.

In implementations, the wireless network devices can also be utilized for sound, vibration, and/or motion sensing such as to detect running water and determine inferences about water usage in a home environment based on algorithms and mapping of the water usage and consumption. This can be used to determine a signature or fingerprint of each water source in the home and is also referred to as "audio fingerprinting water usage." Similarly, the wireless network devices can be utilized to detect the subtle sound, vibration, and/or motion of unwanted pests, such as mice and other rodents, as well as by termites, cockroaches, and other insects. The system can then notify an occupant of the suspected pests in the environment, such as with warning messages to help facilitate early detection and prevention.

The environment 1000 may include one or more wireless network devices that function as a hub 1046. The hub 1046 may be a general-purpose home automation hub, or an application-specific hub, such as a security hub, an energy management hub, an HVAC hub, and so forth. The functionality of a hub 1046 may also be integrated into any wireless network device, such as a network-connected thermostat device or the border router 106. Hosting functionality on the hub 1046 in the structure 1012 can improve reliability when the user's internet connection is unreliable, can reduce latency of operations that would normally have to connect to the cloud service 112, and can satisfy system and regulatory constraints around local access between wireless network devices.

Additionally, the example environment 1000 includes a network-connected speaker 1048. The network-connected speaker 1048 provides voice assistant services that include providing voice control and/or commissioning of network-connected devices. The functions of the hub 1046 may be hosted in the network-connected speaker 1048. The network-connected speaker 1048 can be configured to communicate via the wireless mesh network 202, the Wi-Fi network 204, or both.

Figure 11:
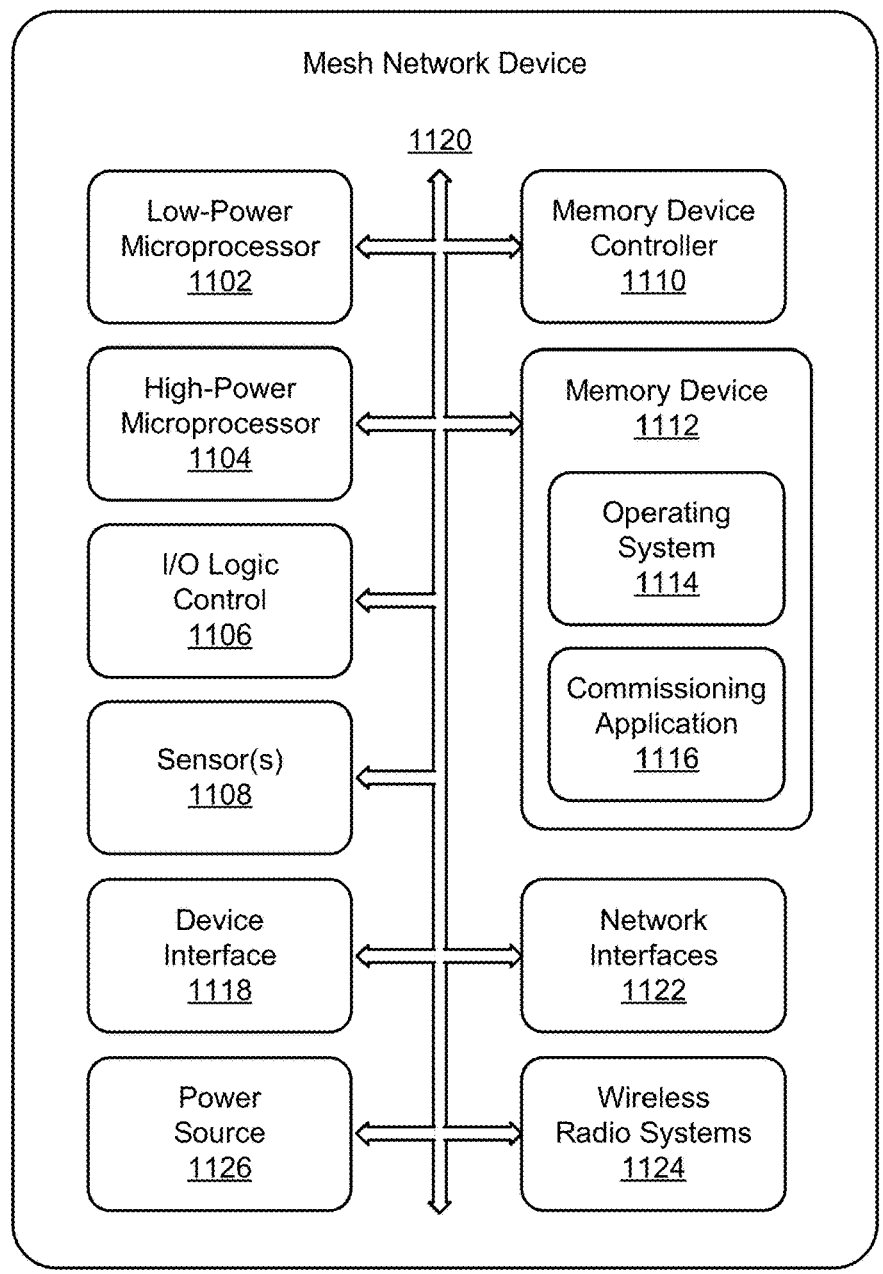
FIG. 11 illustrates an example wireless network device that can be implemented in a home area network environment in accordance with one or more aspects of the techniques described herein.

FIG. 11 illustrates an example wireless network device 1100 that can be implemented as any of the wireless network devices in a home area network (Weave network) in accordance with one or more aspects of securing return communication through application uniform resource locators as described herein. The device 1100 can be integrated with electronic circuitry, microprocessors, memory, input output (I/O) logic control, communication interfaces and components, as well as other hardware, firmware, and/or software to implement the device in a home area network. Further, the wireless network device 1100 can be implemented with various components, such as with any number and combination of different components as further described with reference to the example device shown in FIG. 12.

In this example, the wireless network device 1100 includes a low-power microprocessor 1102 and a high-power microprocessor 1104 (e.g., microcontrollers or digital signal processors) that process executable instructions. The device also includes an input-output (I/O) logic control 1106 (e.g., to include electronic circuitry). The microprocessors can include components of an integrated circuit, programmable logic device, a logic device formed using one or more semiconductors, and other implementations in silicon and/or hardware, such as a processor and memory system implemented as a system-on-chip (SoC). Alternatively or additionally, the device can be implemented with any one or combination of software, hardware, firmware, or fixed logic circuitry that may be implemented with processing and control circuits. The low-power microprocessor 1102 and the high-power microprocessor 1104 can also support one or more different device functionalities of the device. For example, the high-power microprocessor 1104 may execute computationally intensive operations, whereas the low-power microprocessor 1102 may manage less-complex processes such as detecting a hazard or temperature from one or more sensors 1108. The low-power microprocessor 1102 may also wake or initialize the high-power microprocessor 1104 for computationally intensive processes.

The one or more sensors 1108 can be implemented to detect various properties such as acceleration, temperature, humidity, water, supplied power, proximity, external motion, device motion, sound signals, ultrasound signals, light signals, fire, smoke, carbon monoxide, global-positioning-satellite (GPS) signals, radio frequency (RF), other electromagnetic signals or fields, or the like. As such, the sensors 1108 may include any one or a combination of temperature sensors, humidity sensors, hazard-related sensors, security sensors, other environmental sensors, accelerometers, microphones, optical sensors up to and including cameras (e.g., charged coupled-device or video cameras), active or passive radiation sensors, GPS receivers, and radio frequency identification detectors. In implementations, the wireless network device 1100 may include one or more primary sensors, as well as one or more secondary sensors, such as primary sensors that sense data central to the core operation of the device (e.g., sensing a temperature in a thermostat or sensing smoke in a smoke detector), while the secondary sensors may sense other types of data (e.g., motion, light or sound), which can be used for energy-efficiency objectives or automation objectives.

The wireless network device 1100 includes a memory device controller 1110 and a memory device 1112, such as any type of a nonvolatile memory and/or other suitable electronic data storage device. The wireless network device 1100 can also include various firmware and/or software, such as an operating system 1114 that is maintained as computer executable instructions by the memory and executed by a microprocessor. The device software may also include a commissioning application 1116 that implements aspects of securing return communication through application uniform resource locators. The wireless network device 1100 also includes a device interface 1118 to interface with another device or peripheral component and includes an integrated data bus 1120 that couples the various components of the wireless network device for data communication between the components. The data bus in the wireless network device may also be implemented as any one or a combination of different bus structures and/or bus architectures.

The device interface 1118 may receive input from a user and/or provide information to the user (e.g., as a user interface), and a received input can be used to determine a setting. The device interface 1118 may also include mechanical or virtual components that respond to a user input. For example, the user can mechanically move a sliding or rotatable component, or the motion along a touchpad may be detected, and such motions may correspond to a setting adjustment of the device. Physical and virtual movable user-interface components can allow the user to set a setting along a portion of an apparent continuum. The device interface 1118 may also receive inputs from any number of peripherals, such as buttons, a keypad, a switch, a microphone, and an imager (e.g., a camera device).

The wireless network device 1100 can include network interfaces 1122, such as a wireless network interface or home area network interface for communication with other wireless network devices in a home area network, and an external network interface for network communication, such as via the Internet. The wireless network device 1100 also includes wireless radio systems 1124 for wireless communication with other wireless network devices via the home area network interface and for multiple, different wireless communications systems. The wireless radio systems 1124 may include Wi-Fi, Bluetooth™, Mobile Broadband, BLE, Thread, Matter, and/or point-to-point IEEE 802.15.4. Each of the different radio systems can include a radio device, antenna, and chipset that is implemented for a particular wireless communications technology. The wireless network device 1100 also includes a power source 1126, such as a battery and/or to connect the device to line voltage. An AC power source may also be used to charge the battery of the device.

Figure 12:
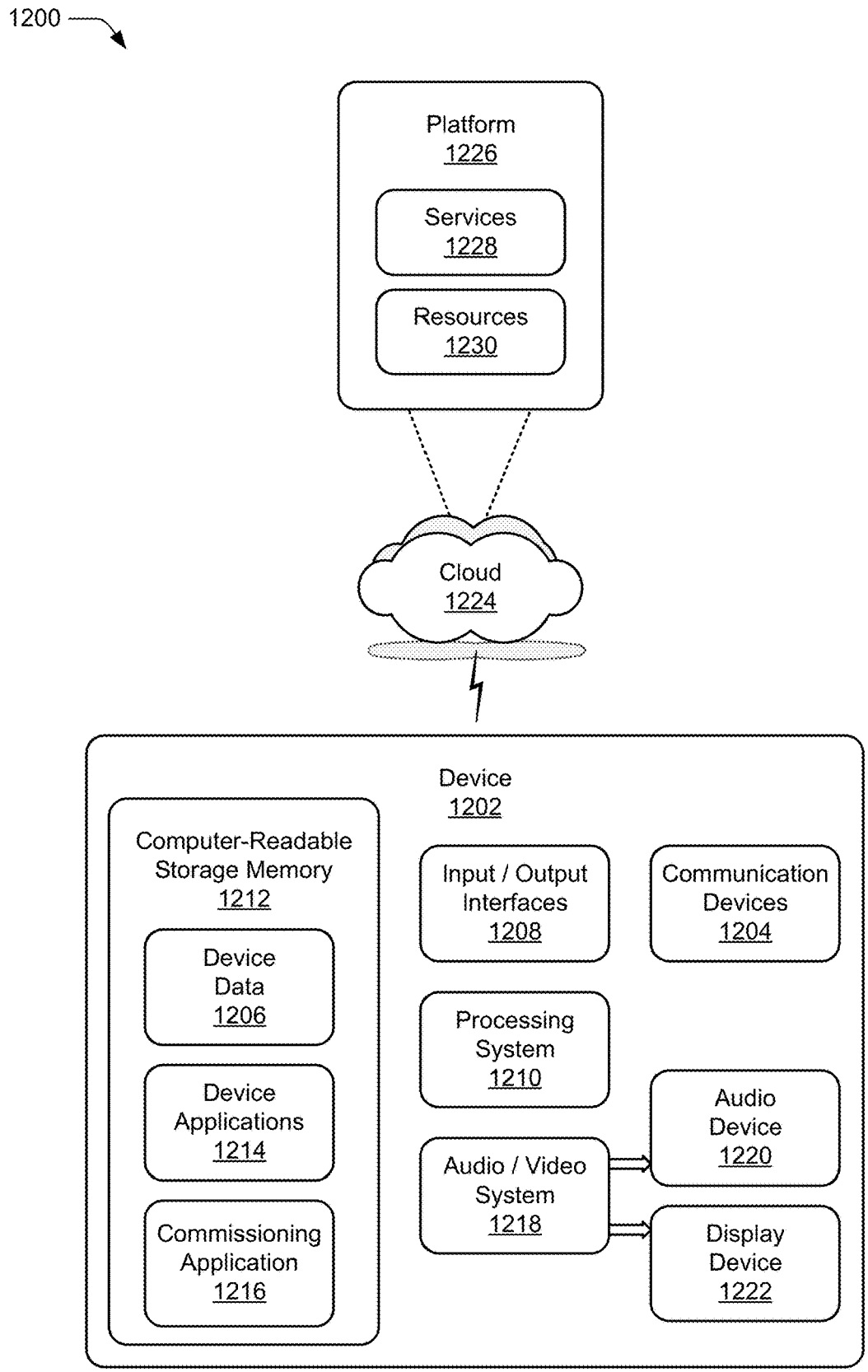
FIG. 12 illustrates an example system with an example device that can implement aspects of securing return communication through application uniform resource locators.

FIG. 12 illustrates an example system 1200 that includes an example device 1202, which can be implemented as any of the wireless network devices that implement aspects of securing return communication through application uniform resource locators as described with reference to the previous FIGS. 1-11. The example device 1202 may be any type of computing device, client device, mobile phone, tablet, communication, entertainment, gaming, media playback, and/or other type of device. Further, the example device 1202 may be implemented as any other type of wireless network device that is configured for communication on a home area network, such as a thermostat, hazard detector, camera, lighting unit, commissioning device, router, border router, joiner router, joining device, end device, leader, access point, and/or other wireless network devices.

The device 1202 includes communication devices 1204 that enable wired and/or wireless communication of device data 1206, such as data that is communicated between the devices in a home area network, data that is being received, data scheduled for broadcast, data packets of the data, data that is synched between the devices, etc. The device data can include any type of communication data, as well as audio, video, and/or image data that is generated by applications executing on the device. The communication devices 1204 can also include transceivers for cellular phone communication and/or for network data communication.

The device 1202 also includes input/output (I/O) interfaces 1208, such as data network interfaces that provide connection and/or communication links between the device, data networks (e.g., a home area network, external network, etc.), and other devices. The I/O interfaces can be used to couple the device to any type of components, peripherals, and/or accessory devices. The I/O interfaces also include data input ports via which any type of data, media content, and/or inputs can be received, such as user inputs to the device, as well as any type of communication data, as well as audio, video, and/or image data received from any content and/or data source.

The device 1202 includes a processing system 1210 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or additionally, the device can be implemented with any one or combination of software, hardware, firmware, or fixed logic circuitry that may be implemented with processing and control circuits. The device 1202 may further include any type of a system bus or other data and command transfer system that couples the various components within the device. A system bus can include any one or combination of different bus structures and architectures, as well as control and data lines.

The device 1202 also includes computer-readable storage memory 1212 (computer-readable storage media 1212), such as data storage devices that can be accessed by a computing device, and that provide persistent storage of data and executable instructions (e.g., software applications, modules, programs, functions, and the like). The computer-readable storage memory described herein excludes propagating signals. Examples of computer-readable storage memory include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage memory in various memory device configurations.

The computer-readable storage memory 1212 (computer-readable storage media 1212) provides storage of the device data 1206 and various device applications 1214, such as an operating system that is maintained as a software application with the computer-readable storage memory and executed by the processing system 1210. The device applications may also include a device manager, such as any form of a control application, software application, signal processing and control module, code that is native to a particular device, a hardware abstraction layer for a particular device, and so on. In this example, the device applications also include a commissioning application 1216 that implements aspects of the initiator 302 of securing return communication through application uniform resource locators, such as when the example device 1202 is implemented as any of the wireless network devices described herein.

The device 1202 also includes an audio and/or video system 1218 that generates audio data for an audio device 1220 and/or generates display data for a display device 1222. The audio device and/or the display device include any devices that process, display, and/or otherwise render audio, video, display, and/or image data, such as the image content of a digital photo. In implementations, the audio device and/or the display device are integrated components of the example device 1202. Alternatively, the audio device and/or the display device are external, peripheral components to the example device. In aspects, at least part of the techniques described for securing return communication through application uniform resource locators may be implemented in a distributed system, such as over a "cloud" 1224 in a platform 1226. The cloud 1224 includes and/or is representative of the platform 1226 for services 1228 and/or resources 1230.

The platform 1226 abstracts underlying functionality of hardware, such as server devices (e.g., included in the services 1228) and/or software resources (e.g., included as the resources 1230), and connects the example device 1202 with other devices, servers, etc. For example, the platform 1226 and/or the services 1228 may implement aspects of the responder 304. The resources 1230 may also include applications and/or data that can be utilized while computer processing is executed on servers that are remote from the example device 1202. Additionally, the services 1228 and/or the resources 1230 may facilitate subscriber network services, such as over the Internet, a cellular network, or Wi-Fi network. The platform 1226 may also serve to abstract and scale resources to service a demand for the resources 1230 that are implemented via the platform, such as in an interconnected device aspect with functionality distributed throughout the system 1200. For example, the functionality may be implemented in part at the example device 1202 as well as via the platform 1226 that abstracts the functionality of the cloud 1224.

In the following some examples are described:

Example 1: A method of commissioning a joiner device to a home area network by an initiator device, the method comprising the initiator device:

obtaining a Responder Access Uniform Resource Locator (URL);

using the obtained Responder Access URL, generating an Augmented Responder Access URL;

accessing the Augmented Responder Access URL, at a responder, the accessing causing the responder to generate a Responder Payload;

accessing an Augmented Initiator Response URL including the generated Responder Payload; and recovering the Responder Payload, the recovering of the Responder Payload causing the initiator device to commission the joiner device to the home area network.

Example 2: The method of example 1, wherein the generating the Augmented Responder Access URL comprises:

generating an initiator ephemeral key pair, including an ephemeral private key and an ephemeral public key;

using the ephemeral private key of the generated initiator ephemeral key pair and a responder public key, deriving a shared secret;

appending the ephemeral public key to a query present in the Responder Access URL;

generating an Initiator Response URL to be accessed with a response, the Initiator Response URL including data to be passed back to the initiator device in the response;

encoding an Initiator Payload that includes an Initiator Response URL;

encrypting an Initiator Payload into an Initiator-Payload-ciphertext-and-tag tuple;

URL-encoding the Initiator-Payload-ciphertext-and-tag tuple; and appending the URL encoded Initiator Payload ciphertext and tag tuple, to the query present in the Responder Access URL.

Example 3: The method of example 2, wherein the encoding the Initiator Payload comprises:
encoding the Initiator Payload that includes the Initiator Response URL and a Responder Query.
Example 4: The method of example 2, wherein the encrypting the Initiator Payload into the Initiator-Payload-ciphertext-and-tag tuple comprises:
encrypting an Initiator Payload into an Initiator-Payload-ciphertext-and-tag tuple using an authenticated encryption with associated data (AEAD) algorithm.
Example 5: The method of any one of the preceding examples, further comprising:
generating a random nonce; and
generating, an Initiator-to-Responder key and a Responder-to-Initiator key, wherein the generating comprises using a Key Derivation Function, the random nonce, a shared secret, and a salt and/or other information to generate a number of bits that are twice the number of key-length bits, and wherein half of the generated bits are an Initiator-to-Responder key and the other half of the generated bits are a Responder-to-Initiator key.
Example 6: The method of any one of the preceding examples, further comprising:
generating, using a Key Derivation Function, a symmetric key of key-length bits that is used in both directions between the initiator device and the responder.
Example 7: The method of any one of the preceding examples, wherein the accessing the Responder Access URL comprises:
accessing the Responder Access URL from an initiator-trusted database.
Example 8: The method of any one of the preceding examples, wherein the recovering the Responder Payload comprises:
extracting a Responder-Payload-ciphertext-and-tag tuple;
decoding the Responder-Payload-ciphertext-and-tag tuple;
removing the Responder-Payload-ciphertext-and-tag tuple from a query field of the Augmented Initiator Response URL;
decrypting and authenticating the Responder Payload using an authenticated encryption with associated data (AEAD) algorithm; and
if the Responder Payload is authenticated, using the Responder Payload to commission the joiner device to the home area network.
Example 9: The method of example 8, wherein the home area network is a Matter network.
Example 10: The method of any one of the preceding examples, wherein the accessing the Augmented Initiator Response URL comprises:
accessing the Augmented Initiator Response URL from the responder; or
accessing the Augmented Initiator Response URL from a proxying intermediary.
Example 11: A method of commissioning a joiner device to a home area network by a responder, the method comprising the responder:
publishing a Responder Access Uniform Resource Locator (URL);
receiving, from an initiator device, an Augmented Responder Access URL;
extracting an Initiator-Payload-ciphertext-and-tag tuple;
decoding the Initiator-Payload-ciphertext-and-tag tuple;
deriving a shared secret using a private key associated with a public key of the responder and an ephemeral public key of the initiator device;
decrypting and authenticating an Initiator Payload using an authenticated encryption with associated data (AEAD) algorithm;
if the Initiator Payload is authenticated, recovering the Initiator Payload; and
generating a Responder Payload to send to the initiator device.
Example 12: The method of example 11, further comprising:
based on the recovering the Initiator Payload, determining that a Responder Query is present; and
based on the determining that the Responder Query is present, determining information to convey back to the initiator device in an Initiator Response URL.
Example 13: The method of example 11 or example 12, wherein the generating a Responder Payload comprises:
deriving a Responder-to-Initiator nonce;
encrypting the Responder Payload into a Responder-Payload-ciphertext-and-tag tuple using the AEAD algorithm;
URL-encoding the Responder-Payload-ciphertext-and-tag tuple; and
appending the URL-encoded Responder-Payload-ciphertext-and-tag tuple to a query present in the Initiator Response URL to generate an Augmented Responder Access URL.
Example 14: The method of example 13, further comprising:
providing the Augmented Responder Access URL for access by the initiator device.
Example 15: The method of example 13, further comprising:
providing the Augmented Responder Access URL to a proxying intermediary that is effective to provide the Augmented Responder Access URL for access by the initiator device.
Example 16: An initiator device comprising:
a network interface;
a processor; and
computer-readable storage media comprising instructions that, responsive to execution by the processor, direct the initiator device to perform a method as recited in any one of examples 1 to 10.
Example 17: The initiator device of example 16, wherein the initiator device is:
a smartphone;
a computer; or
a network-connected speaker.
Example 18: A responder device comprising:
a network interface;
a processor; and
computer-readable storage media comprising instructions that, responsive to execution by the processor, direct the responder device to perform a method as recited in any one of examples 11 to 15.
Example 19: The responder device of example 18, wherein the responder device is:
a cloud service;
a wireless network device;
a border router;
a hub;
an internet client device; or
smartphone.

Example 20: Computer-readable storage media comprising instructions, responsive to execution by a processor, for directing an apparatus to perform a method as recited in any one of examples 1 to 15.

Although aspects of securing return communication through application uniform resource locators have been described in language specific to features and/or methods, the subject of the appended claims is not necessarily limited to the specific features or methods described. Rather, the specific features and methods are disclosed as example implementations of securing return communication through application uniform resource locators, and other equivalent features and methods are intended to be within the scope of the appended claims. Further, various different aspects are described, and it is to be appreciated that each described aspect can be implemented independently or in connection with one or more other described aspects.

What is claimed is:

1. A method of commissioning a joiner device to a home area network by an initiator device, the method comprising the initiator device:
   obtaining a Responder Access Uniform Resource Locator (URL);
   using the obtained Responder Access URL, generating an Augmented Responder Access URL;
   accessing the Augmented Responder Access URL, at a responder, the accessing causing the responder to generate a Responder Payload;
   accessing an Augmented Initiator Response URL including the generated Responder Payload; and
   recovering the Responder Payload, the recovering of the Responder Payload causing the initiator device to commission the joiner device to the home area network.

2. The method of claim 1, wherein the generating the Augmented Responder Access URL comprises:
   generating an initiator ephemeral key pair, including an ephemeral private key and an ephemeral public key;
   using the ephemeral private key of the generated initiator ephemeral key pair and a responder public key, deriving a shared secret;
   appending the ephemeral public key to a query present in the Responder Access URL;
   generating an Initiator Response URL to be accessed with a response, the Initiator Response URL including data to be passed back to the initiator device in the response;
   encoding an Initiator Payload that includes an Initiator Response URL;
   encrypting an Initiator Payload into an Initiator-Payload-ciphertext-and-tag tuple;
   URL-encoding the Initiator-Payload-ciphertext-and-tag tuple; and
   appending the URL encoded Initiator Payload ciphertext and tag tuple, to the query present in the Responder Access URL.

3. The method of claim 2, wherein the encoding the Initiator Payload comprises:
   encoding the Initiator Payload that includes the Initiator Response URL and a Responder Query.

4. The method of claim 2, wherein the encrypting the Initiator Payload into the Initiator-Payload-ciphertext-and-tag tuple comprises:
   encrypting an Initiator Payload into an Initiator-Payload-ciphertext-and-tag tuple using an authenticated encryption with associated data (AEAD) algorithm.

5. The method of claim 1, further comprising:
   generating a random nonce; and
   generating, an Initiator-to-Responder key and a Responder-to-Initiator key, wherein the generating comprises using a Key Derivation Function, the random nonce, a shared secret, and a salt and/or other information to generate a number of bits that are twice the number of key-length bits, and wherein half of the generated bits are an Initiator-to-Responder key and the other half of the generated bits are a Responder-to-Initiator key.

6. The method of claim 1, further comprising:
   generating, using a Key Derivation Function, a symmetric key of key-length bits that is used in both directions between the initiator device and the responder.

7. The method of claim 1, wherein the accessing the Responder Access URL comprises:
   accessing the Responder Access URL from an initiator-trusted database.

8. The method of claim 1, wherein the recovering the Responder Payload comprises:
   extracting a Responder-Payload-ciphertext-and-tag tuple;
   decoding the Responder-Payload-ciphertext-and-tag tuple;
   removing the Responder-Payload-ciphertext-and-tag tuple from a query field of the Augmented Initiator Response URL;
   decrypting and authenticating the Responder Payload using an authenticated encryption with associated data (AEAD) algorithm; and
   if the Responder Payload is authenticated, using the Responder Payload to commission the joiner device to the home area network.

9. The method of claim 8, wherein the home area network is a Matter network.

10. The method of claim 1, wherein the accessing the Augmented Initiator Response URL comprises:
    accessing the Augmented Initiator Response URL from the responder; or
    accessing the Augmented Initiator Response URL from a proxying intermediary.

11. A method of commissioning a joiner device to a home area network by a responder, the method comprising the responder:
    publishing a Responder Access Uniform Resource Locator (URL);
    receiving, from an initiator device, an Augmented Responder Access URL;
    extracting an Initiator-Payload-ciphertext-and-tag tuple;
    decoding the Initiator-Payload-ciphertext-and-tag tuple;
    deriving a shared secret using a private key associated with a public key of the responder and an ephemeral public key of the initiator device;
    decrypting and authenticating an Initiator Payload using an authenticated encryption with associated data (AEAD) algorithm;
    if the Initiator Payload is authenticated, recovering the Initiator Payload; and
    generating a Responder Payload to send to the initiator device.

12. The method of claim 11, further comprising:
    based on the recovering the Initiator Payload, determining that a Responder Query is present; and
    based on the determining that the Responder Query is present, determining information to convey back to the initiator device in an Initiator Response URL.

13. The method of claim 11, wherein the generating a Responder Payload comprises:
  deriving a Responder-to-Initiator nonce;
  encrypting the Responder Payload into a Responder-Payload-ciphertext-and-tag tuple using the AEAD algorithm;
  URL-encoding the Responder-Payload-ciphertext-and-tag tuple; and
  appending the URL-encoded Responder-Payload-ciphertext-and-tag tuple to a query present in the Initiator Response URL to generate an Augmented Initiator Response Access URL.

14. The method of claim 13, further comprising:
  providing the Augmented Initiator Response Access URL for access by the initiator device.

15. The method of claim 13, further comprising:
  providing the Augmented Initiator Response Access URL to a proxying intermediary that is effective to provide the Augmented Initiator Response Access URL for access by the initiator device.

16. An initiator device comprising:
  a network interface;
  a processor; and
  computer-readable storage memory comprising instructions that, responsive to execution by the processor, direct the initiator device to:
    obtain a Responder Access Uniform Resource Locator (URL);
    using the obtained Responder Access URL, generate an Augmented Responder Access URL;
    access the Augmented Responder Access URL at a responder, the accessing causing the responder to generate a Responder Payload;
    access an Augmented Initiator Response URL including the generated Responder Payload; and
    recover the Responder Payload, the recovering of the Responder Payload causing the initiator device to commission a joiner device to a home area network.

17. The initiator device of claim 16, wherein the initiator device is:
  a smartphone;
  a computer; or
  a network-connected speaker.

18. A responder device comprising:
  a network interface;
  a processor; and
  computer-readable storage memory comprising instructions that, responsive to execution by the processor, direct the responder device to:
    publish a Responder Access Uniform Resource Locator (URL);
    receive, from an initiator device, an Augmented Responder Access URL;
    extract an Initiator-Payload-ciphertext-and-tag tuple;
    decode the Initiator-Payload-ciphertext-and-tag tuple;
    derive a shared secret using a private key associated with a public key of the responder and an ephemeral public key of the initiator device;
    decrypt and authenticate an Initiator Payload using an authenticated encryption with associated data (AEAD) algorithm;
    if the Initiator Payload is authenticated, recover the Initiator Payload; and
    generate a Responder Payload to send to the initiator device.

19. The responder device of claim 18, wherein the responder device is:
  a cloud service;
  a wireless network device;
  a border router;
  a hub;
  an internet client device; or
  smartphone.

20. Computer-readable storage memory comprising instructions, responsive to execution by a processor, for directing an apparatus to:
  obtain a Responder Access Uniform Resource Locator (URL);
  using the obtained Responder Access URL, generate an Augmented Responder Access URL;
  access the Augmented Responder Access URL at a responder, the accessing causing the responder to generate a Responder Payload;
  access an Augmented Initiator Response URL including the generated Responder Payload; and
  recover the Responder Payload, the recovering of the Responder Payload causing an initiator device to commission a joiner device to a home area network.

* * * * *

UNITED STATES PATENT AND TRADEMARK OFFICE
CERTIFICATE OF CORRECTION

PATENT NO. : 12,328,574 B2
APPLICATION NO. : 18/306870
DATED : June 10, 2025
INVENTOR(S) : Tennessee Carmel-Veilleux and Douglas Andrew Steedman Page 1 of 1

It is certified that error appears in the above-identified patent and that said Letters Patent is hereby corrected as shown below:

In the Claims

Column 27, Line 12, after "Response" before "URL", delete "Access"
Column 27, Line 14, after "Response" before "URL", delete "Access"
Column 27, Line 17, after "Response" before "URL", delete "Access"
Column 27, Line 19, after "Response" before "URL", delete "Access"

Signed and Sealed this
Eighth Day of July, 2025

Coke Morgan Stewart
*Acting Director of the United States Patent and Trademark Office*